(12) United States Patent
Tanabe et al.

(10) Patent No.: US 8,736,211 B2
(45) Date of Patent: May 27, 2014

(54) MOTOR CONTROL DEVICE

(75) Inventors: Akira Tanabe, Tokyo (JP); Yoshihiro Marushita, Tokyo (JP); Hidetoshi Ikeda, Tokyo (JP); Kei Terada, Tokyo (JP); Tetsuya Tanabe, Tokyo (JP); Masahiko Yoshida, Tokyo (JP); Masanori Ozaki, Aichi (JP)

(73) Assignee: Mitsubishi Electric Corporation, Tokyo (JP)

( * ) Notice: Subject to any disclaimer, the term of this patent is extended or adjusted under 35 U.S.C. 154(b) by 435 days.

(21) Appl. No.: 13/257,627

(22) PCT Filed: Mar. 8, 2010

(86) PCT No.: PCT/JP2010/001590
§ 371 (c)(1),
(2), (4) Date: Sep. 20, 2011

(87) PCT Pub. No.: WO2010/119605
PCT Pub. Date: Oct. 21, 2010

(65) Prior Publication Data
US 2012/0007540 A1 Jan. 12, 2012

(30) Foreign Application Priority Data
Apr. 14, 2009 (JP) ................................ 2009-098074

(51) Int. Cl.
*H02P 7/00* (2006.01)
(52) U.S. Cl.
USPC ...... 318/432; 318/560; 318/561; 318/568.18; 318/721; 318/799; 318/430; 318/437
(58) Field of Classification Search
USPC ............ 318/120, 135, 136, 560, 561, 568.18, 318/611, 619, 623, 400.07, 400.14, 400.15, 318/264, 430, 432, 433, 437, 701, 721, 727, 318/799
See application file for complete search history.

(56) References Cited

U.S. PATENT DOCUMENTS

| | | | |
|---|---|---|---|
| 5,475,291 A | 12/1995 | Yoshida et al. | |
| 6,844,693 B2 * | 1/2005 | Tazawa et al. | 318/561 |

FOREIGN PATENT DOCUMENTS

| | | |
|---|---|---|
| JP | 11 27949 | 1/1999 |
| JP | 11-346492 A | 12/1999 |

(Continued)

OTHER PUBLICATIONS

Office Action issued May 7, 2013, in Japanese Patent Application No. 2011-509182 (with English-language translation).

(Continued)

*Primary Examiner* — Antony M Paul
(74) *Attorney, Agent, or Firm* — Oblon, Spivak, McClelland, Maier & Neustadt, L.L.P.

(57) ABSTRACT

Provided is a motor control device which realizes automatic adjustment of control of a motor for driving a mechanical load through a simple operation. The motor control device includes: a follow-up control unit (6) for receiving detection information of a detector (3) to output a torque command signal and output a status of motor control of a motor (1) as a control status amount signal, when a command signal regarding the motor control to be output from an upper-level controller is absent; an oscillation detection unit (9) for receiving the control status amount signal and detecting oscillation of a control status amount to output an oscillation detection signal; and an automatic adjustment unit (10) for receiving the oscillation detection signal to monitor a control status of the motor (1) and adjust a control parameter of the follow-up control unit (6) only when abnormality is detected.

7 Claims, 21 Drawing Sheets

(56) References Cited

FOREIGN PATENT DOCUMENTS

| | | |
|---|---|---|
| JP | 2004 192448 | 7/2004 |
| JP | 2005 332213 | 12/2005 |
| JP | 2007 141189 | 6/2007 |
| JP | 2008 79441 | 4/2008 |
| JP | 4150892 | 9/2008 |
| WO | 2008 087893 | 7/2008 |

OTHER PUBLICATIONS

International Search Report Issued Jun. 15, 2010 in PCT/JP10/001590 Filed Mar. 8, 2010.

Office Action and Search Report issued Dec. 21, 2012 in Taiwanese Patent Application No. 099105260 with English language translation.

* cited by examiner

MOTOR CONTROL DEVICE

TECHNICAL FIELD

The present invention relates to a motor control device for controlling a motor for driving a mechanical load, and more particularly, to an automatic adjusting function for control parameters.

BACKGROUND ART

When adjusting control parameters in a motor control device, it is necessary to set control parameters, such as feedback gain, feedforward gain, and a notch filter within the motor control device, in accordance with mechanical load connected to a motor before actual operation in which the device is actually running.

For example, when adjusting the feedback gain, the feedback gain needs to be set as large as possible in order to increase response of a machine. However, a signal at a resonance point of the machine may be excited as the feedback gain is set larger, and hence oscillation occurs in a torque command, which is a control status amount, or a detection position or speed of the motor, leading to an oscillatory state. Therefore, the feedback gain needs to be set within a range in which the control status amount does not oscillate and the motor is stably operable.

Further, when adjusting the notch filter, in a case where oscillation occurs in the control status amount in the above-mentioned adjustment of the feedback gain, the notch filter is set so as to cut off a component of an oscillatory frequency. In this manner, the oscillation at the oscillatory frequency can be suppressed, with the result that the feedback gain can further be increased.

Further, when adjusting the feedforward gain, the feedforward gain needs to be set as large as possible in order to increase the response of the machine. However, setting the feedforward gain larger leads to oscillation of a positional deviation, which is the control status amount. Therefore, the feedforward gain needs to be set within a range in which an overshoot amount in a stopping state satisfies target performance.

When adjusting those control parameters manually, it is necessary to repeat such trial and error that the machine is operated every time the control parameters are changed and, the response thereof is determined. Thus, a large amount of time and effort are required therefor.

Meanwhile, there are known conventional technologies for adjusting the control parameters in a simple manner, which are described in JP 4150892 B (Patent Document 1), JP 2005-332213 A (Patent Document 2), and JP 2004-192448 A (Patent Document 3).

Patent Document 1 discloses the following motor control device. A command pattern having a trapezoidal wave or a triangular wave for accelerating and decelerating the motor is generated in the motor control device based on parameters input through the parameter input device, which is an external input/output device, and a continuous operation pattern for adjustment, in which the command pattern is repeated a set number of times, is generated and output to operate the machine. Thus, the control parameters are adjusted.

Patent Document 2 discloses the following motor control device. When an activation operation is performed by using the push button or switch of the motor control device, an activation signal is transmitted to the automatic operation function unit. Based on parameters set in the parameter setting unit, a position command for reciprocating the load device (corresponding to the continuous operation pattern for adjustment) is generated and, the gain is automatically adjusted by the gain operation unit.

Patent Document 3 discloses the motor control device that is provided with the steps of: decreasing, by the adjustment unit, the gain when it is determined that excessive deviation abnormality occurs or that operation completion signal abnormality occurs while the operation is repeated in accordance with the control command amount generated by the command generator, and performing the operation again; and determining, when the operation completion signal is normal, whether or not the stabilization time is shorter, and when the stabilization time is shorter than in the previous operation or at the time of the first operation, recording the stabilization time, increasing the gain, and performing the operation again. When there is no reduction in stabilization time through repetition of the above-mentioned steps, the adjustment is completed. Thus, the adjustment is performed automatically.

CITATION LIST

Patent Document

Patent Document 1: JP 4150892 B
Patent Document 2: JP 2005-332213 A
Patent Document 3: JP 2004-192448 A

SUMMARY OF INVENTION

Technical Problems

In the above-mentioned technologies disclosed in Patent Document 1 and Patent Document 2, it is necessary to determine the continuous operation pattern for adjustment. For example, it is necessary to set operation parameters for adjustment in advance, such as a motor rotation speed, a movement distance, and an acceleration/deceleration time constant. Further, the operation parameters for adjustment need to be set individually in consideration of the specification of the machine because an operation condition in which the machine is operable is different depending on the machine to be actually driven. Hence, there is a problem in that labor is required for setting work for the operation parameters for adjustment and work for confirmation of the operation.

Further, when operating the machine after the operation parameters for adjustment are set, the operation needs to start from a start position suitable for the set continuous operation pattern for adjustment. Therefore, in a case where any change occurs in circumference such as a change in mounting situation of the machine or a change of the machine itself over time, or in a case where the adjustment is performed again, for example, a case where the adjustment operation is suspended, there is a problem in that it is necessary to perform recovery work to the suitable start position before the start of the readjustment, or perform setting change of the operation parameters for adjustment.

Further, there is a problem in that the external input/output device such as the parameter input device or a personal computer (PC) needs to be prepared in order to generate the continuous operation pattern for adjustment.

Then, in the technology disclosed in Patent Document 3, the gain as the control parameter is adjusted by performing the predetermined adjustment sequence along with the operation of the machine. Therefore, in a case where abnormality occurs before the command of the operation pattern is issued, for example, at the time of initial activation of the machine, there is a problem in that the adjustment for automatically achieving the stabilization cannot be performed.

Further, in a case where abnormality occurs during the actual operation after the adjustment sequence is completed due to the change in circumference such as a change in mounting situation of the machine or a change of the machine itself over time, there is a problem in that the stabilization cannot be achieved automatically.

It is therefore an object of the present invention to provide a motor control device which can automatically adjust control parameters for motor control through a simple and minimal operation and in a short period of time even at the time of initial activation or during an actual operation.

Solution to Problems

The present invention provides a motor control device for controlling a motor for driving a mechanical load, based on a detection information signal input from a detector that is connected to the motor, the motor control device including:

a follow-up control unit for receiving the detection information signal to output, to the motor, a torque command signal for controlling an operation of the motor and output a control status of the motor as a control status amount signal, when a command signal regarding motor control to be output from an upper-level controller is absent;

an oscillation detection unit for receiving the control status amount signal and detecting oscillation of a control status amount that occurs in the follow-up control unit to output a result of the detection as an oscillation detection signal; and an automatic adjustment unit for receiving the oscillation detection signal to monitor the control status of the motor and adjust a control parameter of the follow-up control unit only when abnormality is detected in the control status of the motor.

Further, the present invention provides a motor control device for controlling a motor for driving a mechanical load, based on a detection information signal input from a detector that is connected to the motor, the motor control device including:

a command status determination unit for determining a status of a command signal regarding motor control to be output from an upper-level controller to output a result of the determination as a command status signal;

a follow-up control unit for receiving the detection information signal and receiving the command signal when the command signal is present to output, to the motor, a torque command signal for controlling an operation of the motor and output a control status of the motor as a control status amount signal;

a stopping-state response determination unit for receiving the command status signal and the control status amount signal to output, as a stopping-state response status signal, a result of determining a response status of the motor in a motor stopping state;

an oscillation detection unit for receiving the control status amount signal and detecting oscillation of a control status amount that occurs in the follow-up control unit to output a result of the detection as an oscillation detection signal;

an automatic adjustment unit for receiving the command status signal, the stopping-state response status signal, and the oscillation detection signal, the automatic adjustment unit including a plurality of adjustment modes for adjusting a control parameter of the follow-up control unit based on the received command status signal, the received stopping-state response status signal, and the received oscillation detection signal; and an adjustment start instruction input unit for receiving an adjustment start instruction from outside to output an adjustment start signal, in which the automatic adjustment unit includes:

a first adjustment mode for monitoring the control status of the motor and adjusting the control parameter of the follow-up control unit only when abnormality is detected in the control status of the motor, irrespective of presence and absence of the command signal; and a second adjustment mode, which transitions from the first adjustment mode in response to the adjustment start instruction to adjust the control parameter based on the command signal, the oscillation detection signal, and the stopping-state response status signal after confirming that the command signal is present, and transitions to the first adjustment mode again after the adjustment is ended.

Advantageous Effects of Invention

According to the motor control device of the present invention, even at the time of the actual operation or even in the case where the command signal to be input from the upper-level controller is absent, the abnormal state of the motor control is constantly monitored, and accordingly the adjustment can be performed only when the abnormal state is detected. Thus, even in the case where abnormality occurs before the command of the operation pattern is issued, for example, at the time of the initial activation, or in the case where abnormality occurs at the time of the actual operation due to the change in circumference such as the change over time, the stabilization can be achieved automatically.

Further, during the actual operation, in which the motor is actually operating based on the command signal input from the upper-level controller, the control parameters can be adjusted in a searching manner only through the operation of inputting the adjustment start instruction. In this manner, it is unnecessary to perform the setting work for the operation parameters for adjustment or perform the work for confirmation of operation by using the continuous operation pattern for adjustment. As a result, the activation work can be performed in a simple manner.

As described above, as an effect of the present invention, optimal adjustment can be performed with the connection of the upper-level controller for performing the actual operation, through a simple and minimal operation, and in a short period of time even at the time of the initial activation or during the actual operation, irrespective of the presence/absence of the command signal to be input from the upper-level controller or the operating/stopping state of the motor.

DESCRIPTION OF EMBODIMENTS

First Embodiment

Hereinbelow, a first embodiment of the present invention is described with reference to FIGS. 1 to 10.

Figure 1:
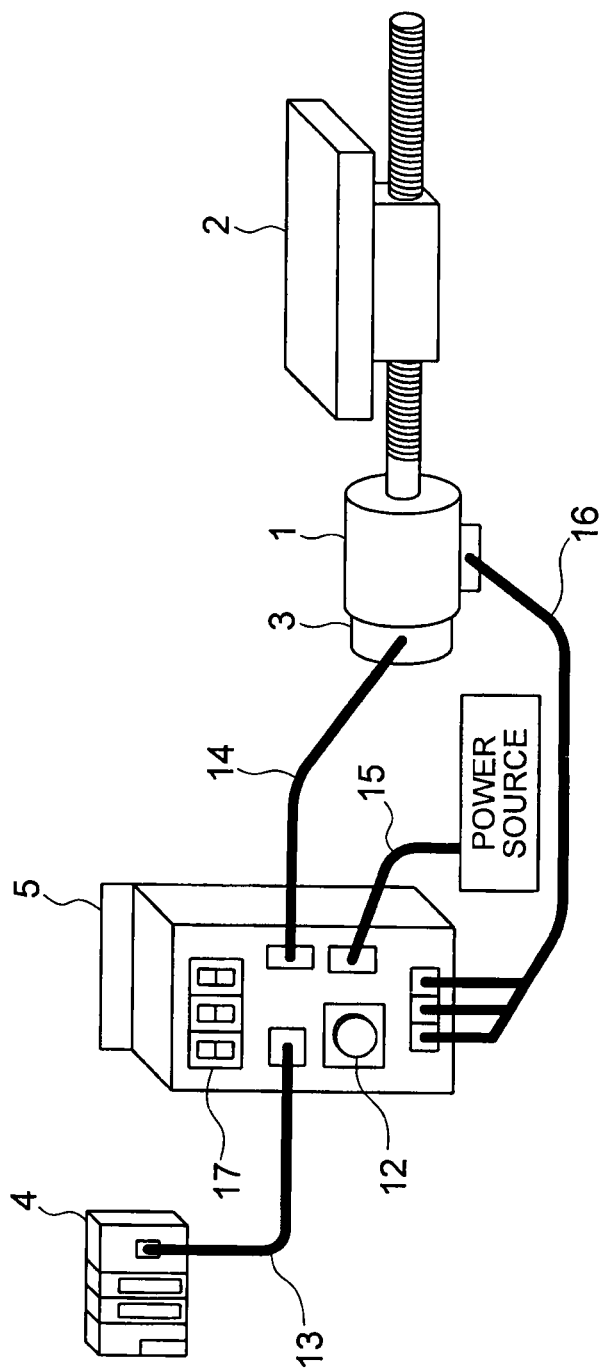
[FIG. 1] A configuration diagram illustrating an example of an entire motor control device system according to the present invention.

FIG. 1 is a configuration diagram illustrating an example of an entire motor control device system. As illustrated in FIG. 1, a motor control device 5 is connected to an upper-level controller 4 for issuing a command regarding motor control to the motor control device 5, a motor 1 for driving a mechanical load 2 connected thereto, and a detector 3 for detecting a rotation position or speed of the motor 1. Here, reference numeral 13 represents a cable for transmitting a command signal input from the controller to the motor control device; 14, a cable for transmitting a detection position or a detection speed from the detector; 15, a cable for supplying power to the motor control device; and 16, a cable for transmitting drive power for driving the motor. Further, the motor control device 5 is provided with a display unit 17 for indicating an internal status of the motor control device 5, and an adjustment start instruction input unit 12 for inputting an adjustment start instruction from outside to the motor control device. The adjustment start instruction input unit 12 may be provided to a casing of the motor control device, and a person may operate the adjustment start instruction input unit 12 from outside to input the adjustment start instruction.

Next, the motor control device 5 is described.

Figure 2:
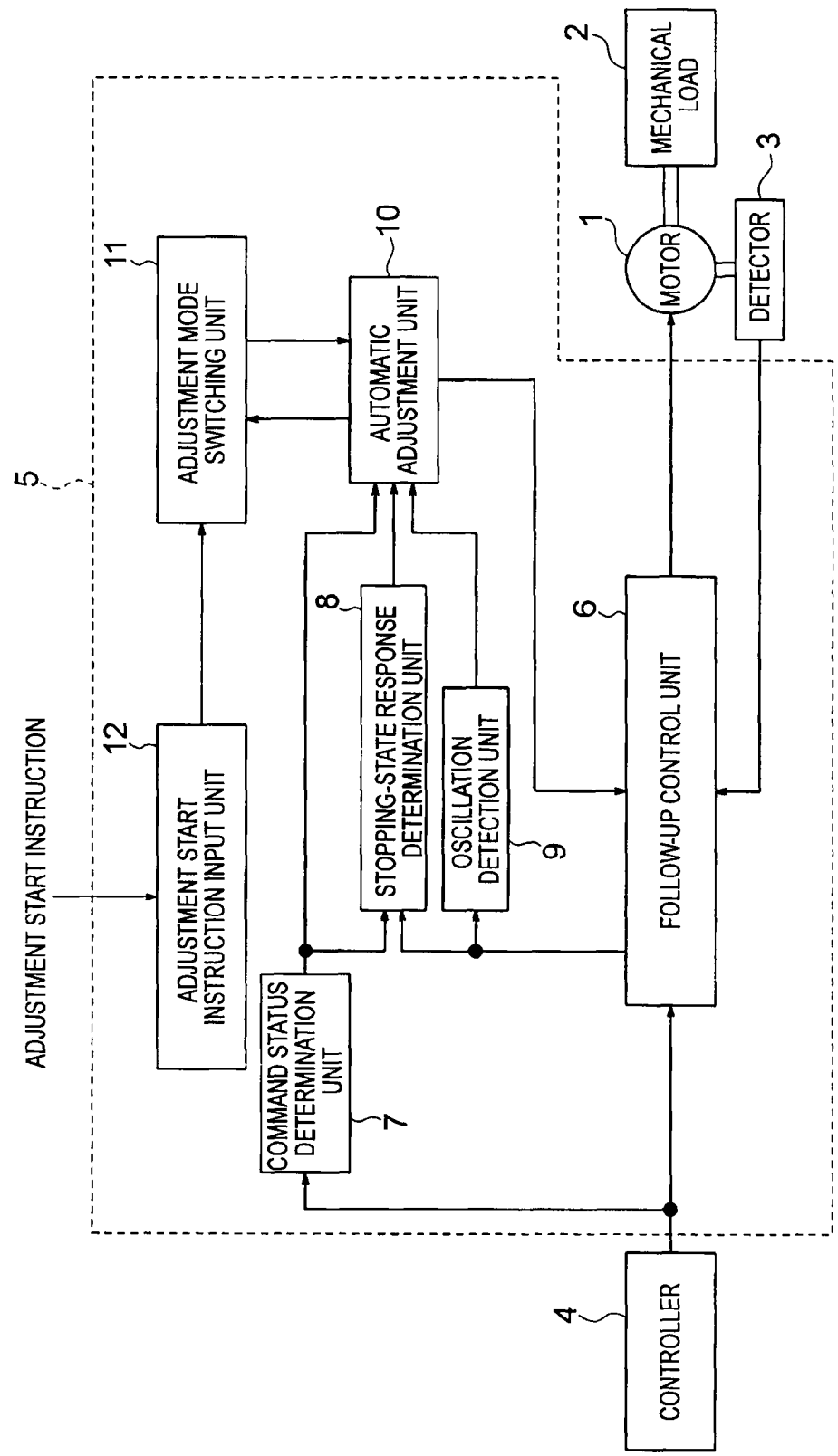
[FIG. 2] A block diagram of a motor control device according to a first embodiment of the present invention.

FIG. 2 is a block diagram illustrating an internal operation of the motor control device 5 according to the first embodiment of the present invention. The motor control device 5 according to this embodiment includes: a follow-up control unit 6 for performing follow-up control of the motor 1; a command status determination unit 7 for determining an operating/stopping state of the motor 1 based on the command signal input from the upper-level controller 4; a stopping-state response determination unit 8 for determining a response status of the motor 1 in a stopping state based on a command status and a follow-up control status; an oscillation detection unit 9 for detecting an oscillation status, such as presence/absence of oscillation and an oscillatory frequency of the oscillation, based on the follow-up control status; an automatic adjustment unit 10 having a plurality of adjustment modes for automatically adjusting control parameters in order to control the motor 1, to thereby change settings of the control parameters of the follow-up control unit 6; an adjustment mode switching unit for switching among the adjustment modes of the automatic adjustment unit 10; and the adjustment start instruction input unit 12 for outputting an adjustment start signal in response to the adjustment start instruction. The respective components are described below.

The follow-up control unit 6 receives: the command signal input from the upper-level controller 4, which changes in time series; detection information signals (detection position signal and detection speed signal) detected by the detector 3 that is connected to the motor 1; and a parameter setting signal output from the automatic adjustment unit 10 described later. The follow-up control unit 6 uses the control parameters set within the follow-up control unit 6 to generate a torque command signal for driving the motor 1 based on the command signal and the detection information signals, and outputs the torque command signal to the motor 1 so that the detection position or the detection speed of the motor 1 follows up the command signal. Further, the follow-up control unit 6 outputs, as a control status amount signal, a control status amount such as a positional deviation, which is an error between the command signal and the detection position signal, and the torque command.

Figure 3:
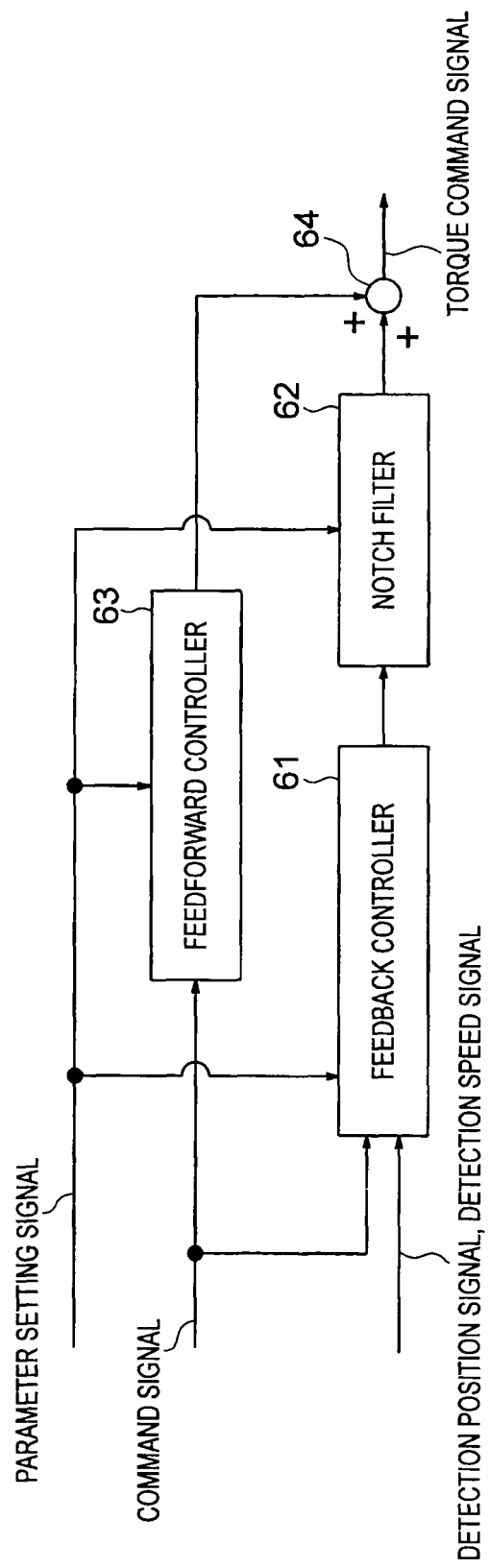
[FIG. 3] A block diagram of a follow-up control unit according to the first embodiment of the present invention.

Next, an internal operation of the follow-up control unit 6 is described with reference to a block diagram of FIG. 3.

The follow-up control unit 6 includes a feedback controller 61, a notch filter 62, a feedforward controller 63, and an adder 64. The respective components are described below.

The feedforward controller 63 receives the command signal, and calculates, based on feedforward gain of an internal proportional circuit, derivative circuit, or the like, a torque signal which allows the motor 1 to quickly follow up the command signal. The feedforward controller 63 then outputs the torque signal.

The feedback controller 61 receives the command signal and also the detection position signal and the detection speed signal, and calculates, based on feedback gain of an internal proportional circuit, derivative circuit, integral circuit, or the like, a torque signal which allows the detection position and the detection speed to follow up the command signal. The feedback controller 61 then outputs the torque signal.

The notch filter 62 receives the torque signal output from the feedback controller 61, and performs calculation to cut off a predetermined frequency component of this input signal. The notch filter 62 then outputs a calculation result as the torque signal.

The adder 64 receives the torque signal from the notch filter 62 and the torque signal from the feedforward controller 63, and adds those signals to each other, to thereby output the torque command signal for driving the motor 1.

Figure 4:
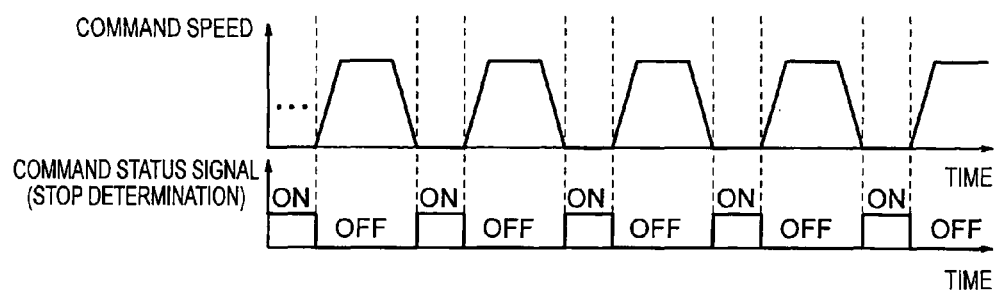
[FIG. 4] A waveform chart for operation/stop determination performed by a command status determination unit according to the first embodiment of the present invention.

The command status determination unit 7 determines the operating/stopping state of the motor 1 based on the command signal input from the upper-level controller 4, and outputs a command status signal. FIG. 4 is a waveform chart illustrating operation/stop determination performed by the command status determination unit 7, in which the upper part illustrates a command speed in the command signal, and the lower part illustrates a state of the command status signal. As illustrated in FIG. 4, the command status determination unit 7 determines a current state as a stopping state (ON) when the command speed in the command signal is absent, and determines the current state as an operating state (OFF) when the command speed in the command signal is present.

Figure 5:
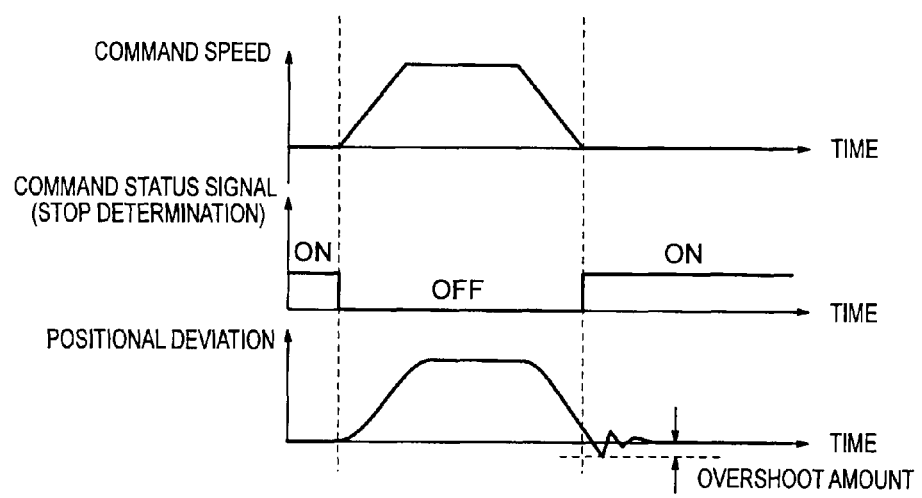
[FIG. 5] A waveform chart for stopping-state evaluation performed by a stopping-state response determination unit according to the first embodiment of the present invention.

The stopping-state response determination unit 8 receives the above-mentioned command status signal and control status amount signal, and evaluates response in the stopping state, to thereby output a stopping-state response status signal. FIG. 5 is a waveform chart illustrating stopping-state evaluation performed by the stopping-state response determination unit 8. As illustrated in FIG. 5, the stopping-state response determination unit 8 uses, for example, a positional deviation signal indicating, which is one of the control status amount, the error between the command signal and the detection position signal, and when an overshoot amount, which is the maximum value of the positional deviation after the determination as the stopping state, does not satisfy a target specification, the stopping-state response determination unit 8 determines that abnormality occurs.

Figure 6:
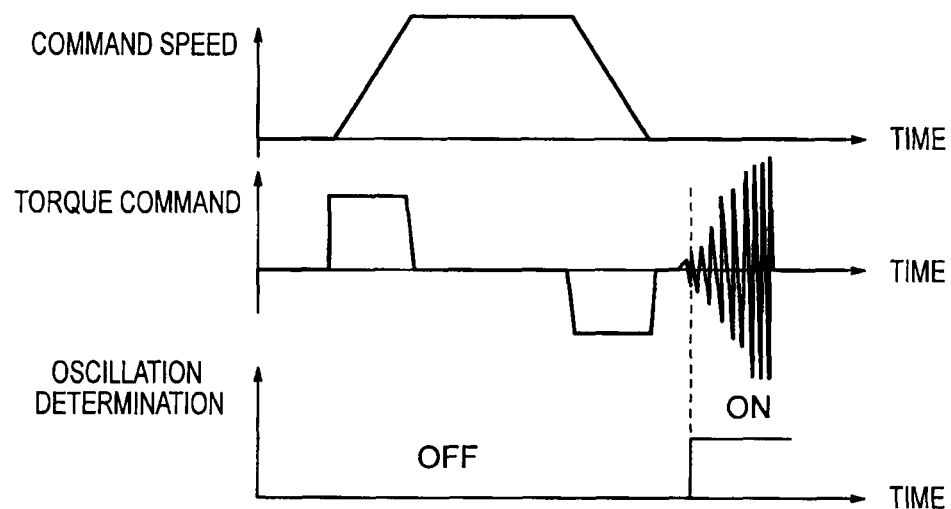
[FIG. 6] A waveform chart for oscillation status evaluation performed by an oscillation detection unit according to the first embodiment of the present invention.

The oscillation detection unit 9 receives the control status amount signal, and performs oscillation detection of detecting, for example, the presence/absence of the oscillation and the oscillatory frequency of the oscillation with respect to the control status amount, to thereby output an oscillation detection signal. FIG. 6 is a waveform chart illustrating oscillation status evaluation performed by the oscillation detection unit 9. As illustrated in FIG. 6, the oscillation detection unit 9 uses, for example, the torque command, which is one of the control status amount, to determine the presence/absence of the oscillation and, detect the oscillatory frequency.

The adjustment mode switching unit 11 receives: the adjustment start signal output from the adjustment start instruction input unit 12 after the adjustment start instruction is input from outside the motor control device 5 through the adjustment start instruction input unit 12; and an adjustment end determination signal output from the automatic adjustment unit 10 after the adjustment is ended. Based on those signals, the adjustment mode switching unit 11 determines switching among the adjustment modes, and outputs an adjustment mode selection signal for selecting one of the adjustment modes.

The automatic adjustment unit 10 receives: the command status signal output from the command status determination unit 7; the stopping-state response status signal output from the stopping-state response determination unit 8; the oscillation detection signal output from the oscillation detection unit 9; and the adjustment mode selection signal output from the adjustment mode switching unit 11. The automatic adjustment unit 10 outputs the adjustment end determination signal to the adjustment mode switching unit 11, and the parameter setting signal for instruction to change the control parameters to the follow-up control unit 6, respectively. The automatic adjustment unit 10 includes a plurality of adjustment mode processing units for performing different adjustment operations, and switches among the adjustment modes based on the adjustment mode selection signal output from the adjustment mode switching unit 11. Further, the automatic adjustment unit 10 performs processing in each of the adjustment modes based on the input command status signal, stopping-state response status signal, and oscillation detection signal, and performs adjustment by outputting the parameter setting signal for changing the settings of the control parameters of the follow-up control unit 6.

The motor adjustment performed by the motor control device according to this embodiment is described conceptually.

Figure 7:
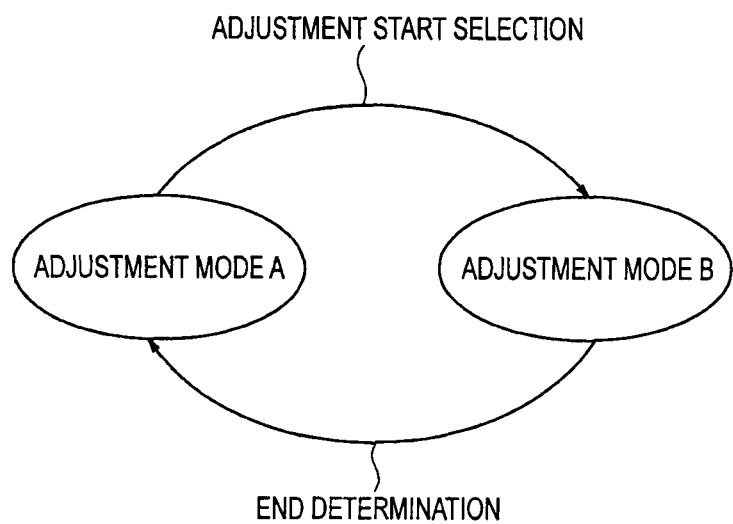
[FIG. 7] A conceptual diagram of mode transition in an automatic adjustment unit according to the first embodiment of the present invention.

FIG. 7 is a conceptual diagram of adjustment mode transition in the motor control device according to this embodiment. As illustrated in FIG. 7, the motor control device according to this embodiment has two adjustment modes for performing different adjustment operations, that is, an adjustment mode A and an adjustment mode B. The adjustment mode A herein refers to an adjustment mode that is effective in a case where the command signal is absent, at the time of initial activation, and at the time of actual operation of the machine. The adjustment mode A is a mode for performing adjustment with limiting an adjustment start condition and ranges of the control parameters to be changed at the time of adjustment. On the other hand, the adjustment mode B herein refers to a mode for performing, after the adjustment mode is switched thereto, adjustment to automatically change the control parameters based on the control status of the motor, to thereby search for optimal control parameters. The adjustment mode B is a mode for performing adjustment in accordance with the mechanical load before the actual operation. After the motor control device 5 is powered on, for example, at the time of the initial activation, the motor control device enters the state of the adjustment mode A. Further, when the adjustment start instruction is input through the adjustment start instruction input unit 12 under the state of the adjustment mode A, the motor control device transitions to the state of the adjustment mode B. When the adjustment of the control parameters in a searching manner under the state of the adjustment mode B is ended, the motor control device transitions to the state of the adjustment mode A again.

Next, an internal operation of the automatic adjustment unit 10 is described.

Figure 8:
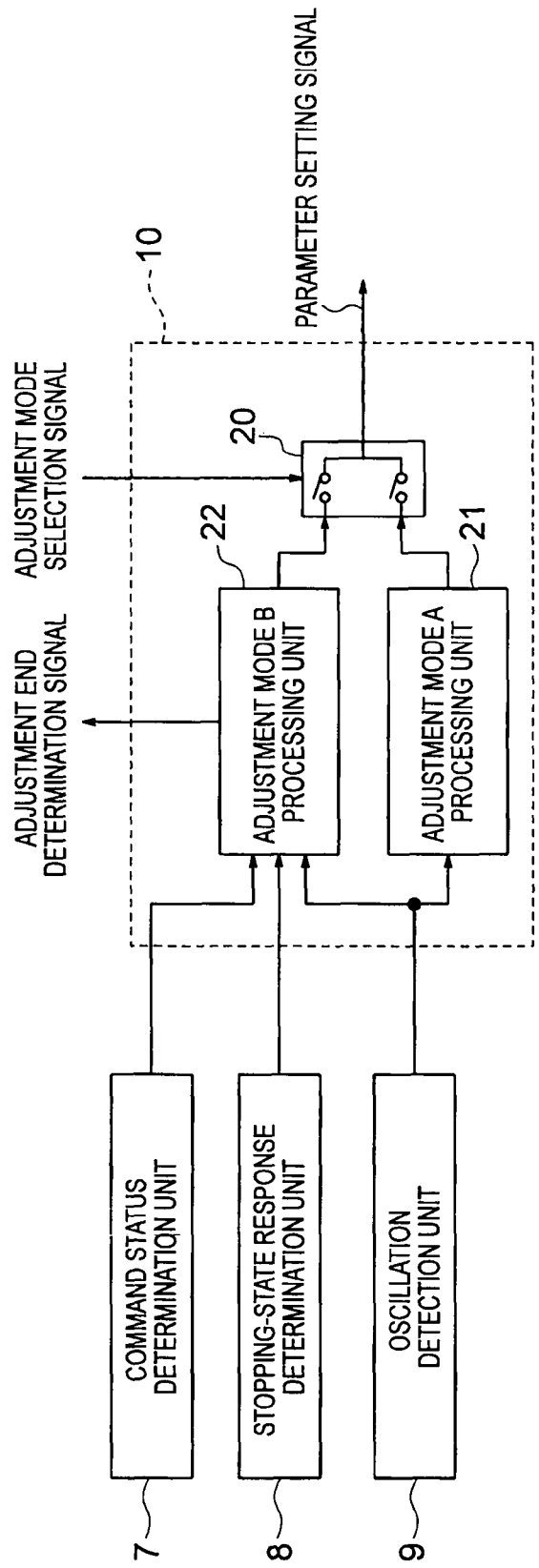
[FIG. 8] A block diagram of the automatic adjustment unit according to the first embodiment of the present invention.

FIG. 8 is a block diagram illustrating the internal operation of the automatic adjustment unit 10. As illustrated in FIG. 8, the automatic adjustment unit 10 includes: an adjustment mode A processing unit 21 for receiving the oscillation detection signal output from the oscillation detection unit 9, performing adjustment processing in the adjustment mode A, and outputting the parameter setting signal; an adjustment mode B processing unit 22 for receiving the oscillation detection signal output from the oscillation detection unit 9, the stopping-state response status signal output from the stopping-state response determination unit 8, and the command status signal output from the command status determination unit 7, performing adjustment processing in the adjustment mode B, and outputting the parameter setting signal; and an input switching unit 20 for selecting one of the adjustment modes based on the adjustment mode selection signal output from the adjustment mode switching unit 11, causing the processing to be executed in the selected adjustment mode, and outputting, to the follow-up control unit 6, the parameter setting signal output from the processing unit of the adjustment mode in which the processing is executed.

At the time of power-on or the like, the motor control device is set in the state of the adjustment mode A. In this state, the parameter setting signal output from the adjustment made A processing unit 21 is output from the automatic adjustment unit 10. After that, under the state in which the motor is operating based on the command signal, when the adjustment start instruction is input through the adjustment start instruction input unit 12 and then the adjustment start signal is output from the adjustment start instruction input unit 12 to the adjustment mode switching unit 11, the adjustment mode selection signal is transmitted from the adjustment mode switching unit 11 to the input switching unit 20. In this manner, the adjustment mode within the automatic adjustment unit 10 is switched from the adjustment mode A to the adjustment mode B. In other words, the adjustment mode B processing unit 22 is selected by the input switching unit 20 in place of the adjustment mode A processing unit 21. Accordingly, the adjustment in the adjustment mode B is executed, and the parameter setting signal output from the adjustment mode B processing unit 22 is output from the automatic adjustment unit 10. Immediately after the control parameter adjustment in the adjustment mode B is ended, the adjustment end determination signal is output from the adjustment mode B processing unit 22 to the adjustment mode switching unit 11, and the adjustment mode selection signal is output from the adjustment mode switching unit 11 to the input switching unit 20. In this manner, the adjustment mode within the automatic adjustment unit 10 is switched from the adjustment mode B to the adjustment mode A again. In other words, the adjustment mode A processing unit 21 is selected in place of the adjustment mode B processing unit 22. Accordingly, the adjustment in the adjustment mode A is executed after the switching, and the parameter setting signal output from the adjustment mode A processing unit 21 is output from the automatic adjustment unit 10.

Next, the adjustment operation in the adjustment mode A is described below.

Figure 9:
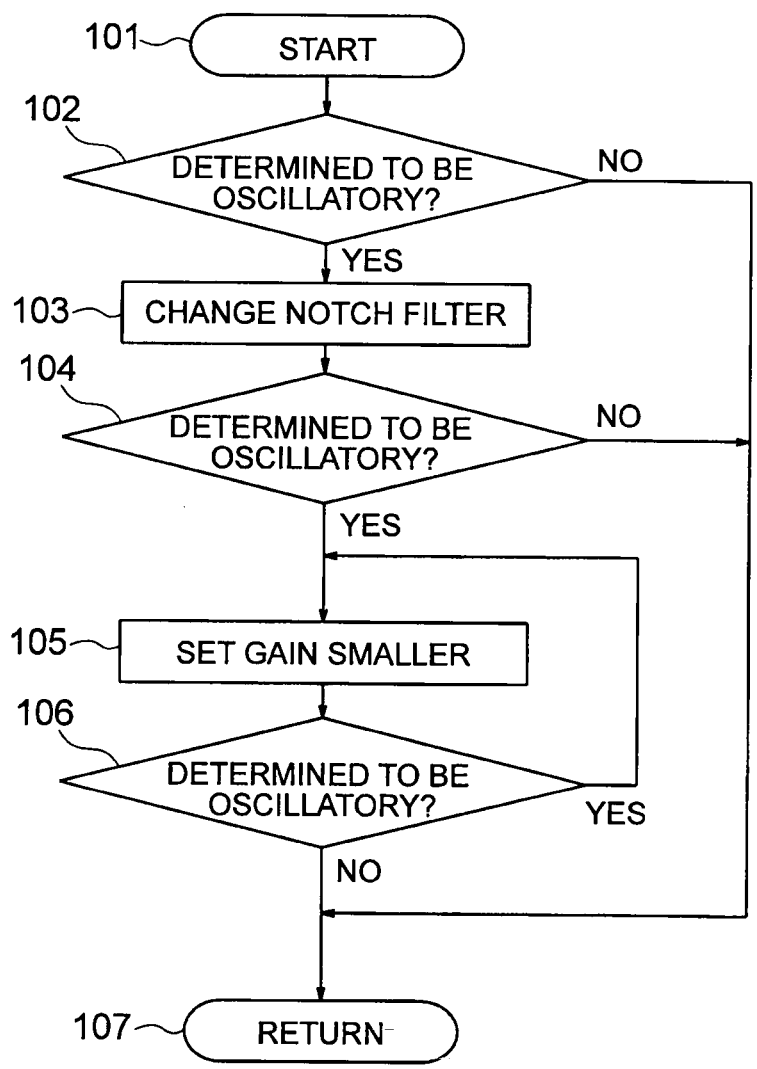
[FIG. 9] A flow chart in an adjustment mode A according to the first embodiment of the present invention.

FIG. 9 is a flow chart illustrating processing performed by the adjustment mode A processing unit 21. The adjustment mode A processing unit 21 starts the processing flow from Step 101. First, the adjustment mode A processing unit 21 determines the presence/absence of the oscillation based on the oscillation detection signal output from the oscillation detection unit 9 (Step 102). When the oscillation is detected, the adjustment mode A processing unit 21 outputs, to the follow-up control unit 6, the parameter setting signal for changing settings of coefficients (for example, filter frequency, depth, and width) for determining the shape of the notch filter 62 (Step 103). The change of the settings of the coefficients for determining the shape of the notch filter 62 involves, for example, matching the filter frequency with the oscillatory frequency, increasing or decreasing the depth, and increasing or decreasing the width. Subsequently, the adjustment mode A processing unit 21 determines the presence/absence of the oscillation again as in Step 102 (Step 104). When the oscillatory state continues, the adjustment mode A processing unit 21 outputs, to the follow-up control unit 6, the parameter setting signal for setting the feedback gain within the feedback controller 61 smaller (Step 105). Subsequently, the adjustment mode A processing unit 21 determines the presence/absence of the oscillation again as in Step 102 (Step 106). When the oscillation continues, the adjustment mode A processing unit 21 executes Step 105 again. When the adjustment mode A processing unit 21 determines in Step 106 that the oscillation continues, the adjustment mode A processing unit 21 repeatedly executes Steps 105 and 106 to decrease the feedback gain up to the level at which the oscillation is no longer detected. In Step 105, the lower limit value of the feedback gain is 0. Further, when the oscillation is not detected in Step 102, 104, or 106, the adjustment mode A processing unit 21 recovers to the state of the start of the processing flow (Step 107), and starts the processing flow from Step 101 again.

As described above, in the operation in the adjustment mode A, the oscillation detection unit detects the oscillation of the control status amount in the follow-up control unit, while the automatic adjustment unit, which has received the oscillation detection signal from the oscillation detection unit, constantly monitors the motor control status and, only when the abnormal state is detected, adjusts the control parameters of the follow-up control unit by outputting the parameter setting signal to the follow-up control unit. Accordingly, in such an adjustment operation, the command signal from the controller is not necessary, and thus the adjustment can be performed even in the state in which the command signal is absent. Further, it is possible to constantly monitor the oscillation status of the motor control and, adjust the control parameters only when the oscillation is detected, irrespective of the operating/stopping state of the motor.

The adjustment operation in the adjustment mode B is described below.

Figure 10:
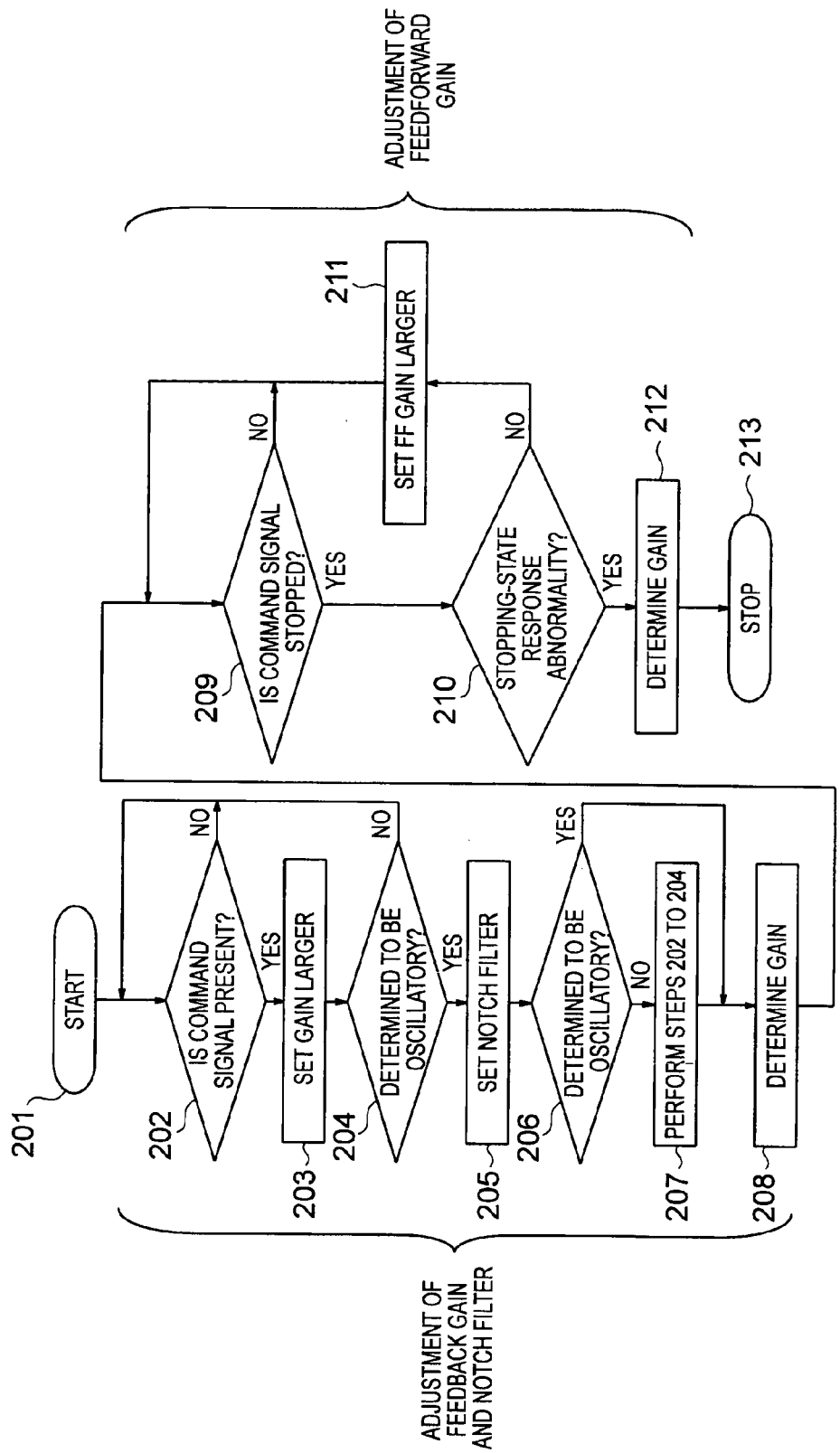
[FIG. 10] A flow chart in an adjustment mode B according to the first embodiment of the present invention.

FIG. 10 is a flow chart illustrating processing performed by the adjustment mode B processing unit 22. When the adjustment mode is switched to the adjustment mode B as described above, the adjustment mode B processing unit 22 starts the processing flow from Step 201.

First, the adjustment mode B processing unit 22 determines the presence/absence of the command signal based on the command status signal output from the command status determination unit 7 (Step 202). When the command signal is present, for example, during the actual operation in which the motor is actually operating based on the command signal input from the upper-level controller, the adjustment mode B processing unit 22 outputs, to the follow-up control unit 6, the parameter setting signal for increasing the feedback gain of the feedback controller 61 (Step 203). In Step 203, the upper limit value of the feedback gain is determined in a range in which control calculation overflow of the motor control device 5 does not occur.

Subsequently, the adjustment mode B processing unit 22 determines the presence/absence of the oscillation based on the oscillation detection signal output from the oscillation detection unit 9 (Step 204). When the oscillation is not detected in Step 204, the adjustment mode B processing unit 22 repeats Steps 202 and 203 to increase the feedback gain of the feedback controller 61 up to the level at which the oscillation occurs. When the oscillation is detected in Step 204, the adjustment mode B processing unit 22 outputs, to the follow-up control unit 6, the parameter setting signal for changing the settings of the coefficients (for example, filter frequency, depth, and width) for determining the shape of the notch filter 62 (Step 205). The change of the settings of the coefficients for determining the shape of the notch filter 62 involves, for example, matching the filter frequency with the oscillatory frequency, increasing or decreasing the depth, and increasing or decreasing the width.

After Step 205, the adjustment mode B processing unit 22 determines the presence/absence of the oscillation again (Step 206). When the oscillation is not detected, the adjustment mode B processing unit 22 repeats Steps 202 to 204 (Step 207). After the adjustment mode B processing unit 22 searches for the feedback gain which allows the oscillation to occur in Step 207, the adjustment mode B processing unit 22 sets, as limit gain, the maximum feedback gain falling within the range in which the oscillation does not occur, and outputs, to the follow-up control unit 6, the parameter setting signal for setting the feedback gain to the limit gain (Step 208). Further, when the oscillation is detected in Step 206, the adjustment mode B processing unit 22 determines that no oscillation suppression effect is produced by the notch filter 62, and executes Step 208.

As described above, by executing Steps 201 to 208, it is possible to adjust the feedback gain of the feedback controller 61 and the notch filter 62.

Subsequently, the adjustment mode B processing unit 22 performs stop determination for the command signal based on the command status signal from the command status determination unit 7 (Step 209). The adjustment mode B processing unit 22 repeats Step 209 until the adjustment mode B processing unit 22 determines that the command signal is in the stopping state.

When the adjustment mode B processing unit 22 determines that the command signal is in the stopping state, the adjustment mode B processing unit 22 determines the presence/absence of stopping-state response abnormality based on the stopping-state response status signal from the stopping-state response determination unit 8 (Step 210).

When the stopping-state response abnormality is absent, the adjustment mode B processing unit 22 outputs, to the follow-up control unit 6, the parameter setting signal for setting the feedforward gain of the feedforward controller 63 larger (Step 211). In Step 211, the upper limit value of the feedforward gain is determined in the range in which the control calculation overflow of the motor control device 5 does not occur.

After that, the adjustment mode B processing unit 22 returns to Step 209, and repeats Steps 209 to 211 until the adjustment mode B processing unit 22 determines in Step 210 that the stopping-state response abnormality is present.

The adjustment mode B processing unit 22 sets, as limit gain, the feedforward gain that is increased through the above-mentioned processing up to the level at which the adjustment mode B processing unit 22 determines in Step 210 that the stopping-state response abnormality is present, and outputs, to the follow-up control unit 6, the parameter setting signal for setting the feedforward gain to this limit gain (Step 212). After the adjustment mode B processing unit 22 outputs the parameter setting signal in Step 212, the adjustment mode B processing unit 22 ends the processing flow (Step 213).

As described above, by executing Steps 209 to 213, it is possible to adjust the feedforward gain of the feedforward controller 63.

As described above, in the operation in the adjustment mode B, after the confirmation of the presence of the command signal during the actual operation in which the motor is actually operating based on the command signal input from the upper-level controller, the parameter setting signal is output to the follow-up control unit 6 in a searching manner based on the presence/absence of the command signal, the presence/absence of the oscillation of the control status amount, and the presence/absence of the stopping-state response abnormality, and the control parameters, such as the feedback gain, the notch filter 62, and the feedforward gain, are changed. Thus, the adjustment can be performed for the optimal control parameters.

In this embodiment, the control parameters are changed also in the adjustment mode A during the actual operation, but alternatively, the control parameters may be set to fixed values in the adjustment mode A. In this case, the adjustment in the adjustment mode B is performed only when the adjustment start instruction is substantially input.

Further, the adjustment start signal is output in response to the adjustment start instruction input through the adjustment start instruction input unit 12 of the motor control device, but alternatively, the adjustment start signal may be input directly from an external input/output device or the like to the adjustment mode switching unit 11.

Next, effects obtained in this embodiment are described.

According to the motor control device in the first embodiment, under the state of the adjustment mode A, the abnormality can be monitored constantly by the oscillation detection unit 9, and the control parameters can be adjusted automatically irrespective of the presence/absence of the command signal from the controller 4 and the operating/stopping state of the motor. Thus, stable motor control can be performed even at the time of the initial activation and during the actual operation.

In the adjustment in the adjustment mode B, the feedback gain can be adjusted sequentially during the operation without waiting for the stop of the command signal. Thus, the adjustment can be performed in a short period of time.

The motor control device is connected to the upper-level controller 4 to perform the actual operation, and switches among the adjustment modes only by inputting the adjustment start instruction to the adjustment start instruction input unit 12 of the motor control device, to thereby perform the adjustment. Thus, there is no need to connect the external input/output device for the adjustment, and the adjustment of the control parameters can be realized through a simple and minimal operation.

When the adjustment start instruction is input again during the actual operation after the adjustment is once ended, the adjustment is performed only minutely with reference to the control parameters set at the time of the previous adjustment. Thus, it is possible to perform the adjustment with a smaller number of times of execution, and reduce the period of time required for the readjustment.

When the control parameters are set to fixed values in the adjustment mode A during the actual operation, the abnormality at the time of the initial activation or due to the change over time cannot be stabilized automatically. However, the adjustment in the adjustment mode B can be performed in a short period of time and in a simple manner as described above.

Second Embodiment

Next, a motor control device according to a second embodiment of the present invention is described with reference to FIGS. 11 and 12.

Figure 11:
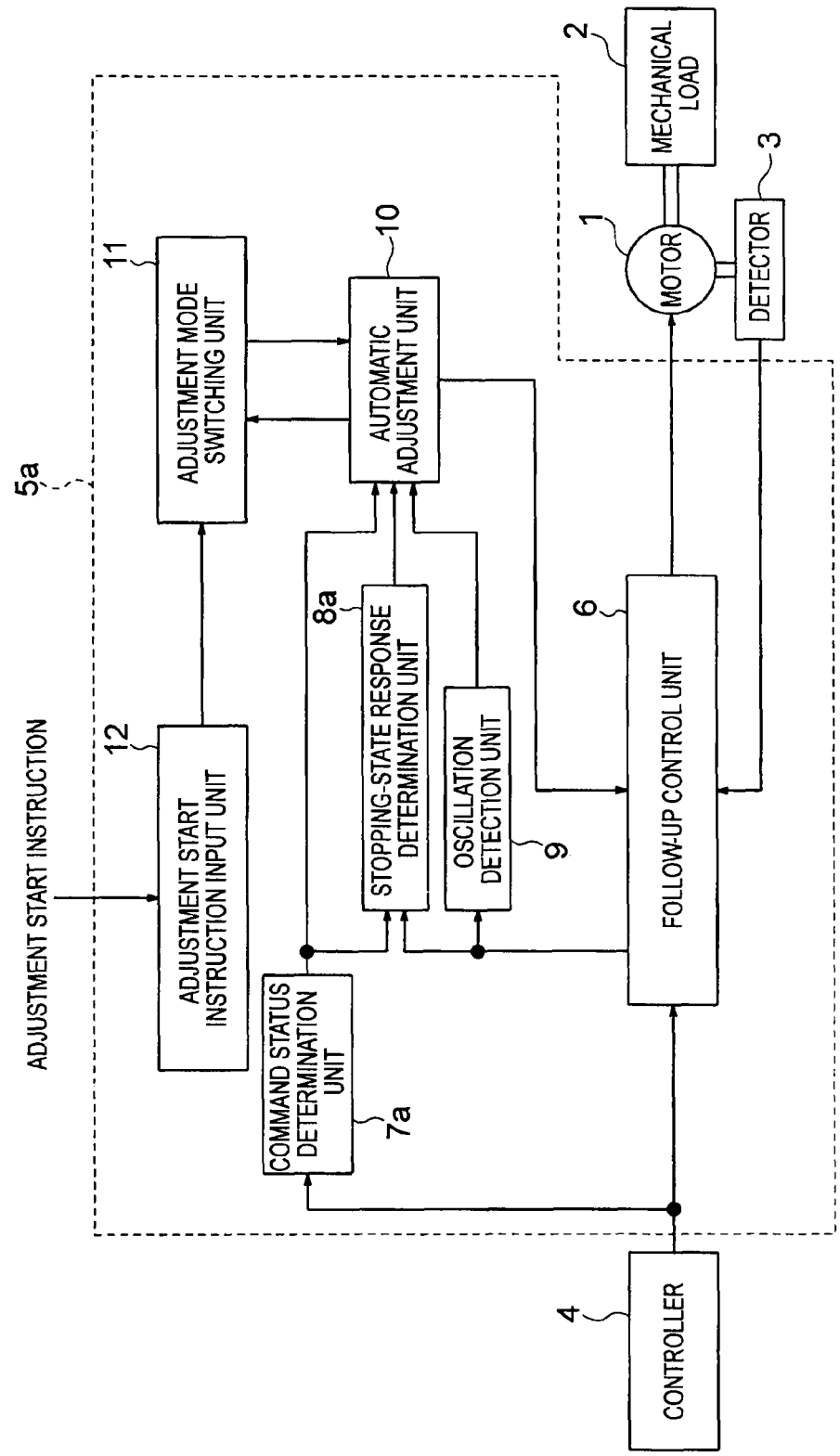
[FIG. 11] A block diagram of a motor control device according to a second embodiment of the present invention.

FIG. 11 is a block diagram of the motor control device according to this embodiment. The motor control device according to this embodiment includes: a command status determination unit 7a having added thereto a function of outputting a command status signal a, in place of the command status determination unit 7 of the motor control device of the first embodiment; and a stopping-state response determination unit 8a for receiving the command status signal a output from the command status determination unit 7a, in place of the stopping-state response determination unit 8 of the motor control device of the first embodiment. Other components of the motor control device according to this embodiment are the same as those of the motor control device according to the first embodiment, and description thereof is therefore omitted herein.

The command status determination unit 7a outputs the command status signal a indicating the determination of the current state as the stopping state (ON) when the command speed in the command signal is absent and when a degree of a command acceleration at the time of stopping is equal to or larger than a predetermined threshold. Here, the above-mentioned acceleration threshold may be a predetermined fixed value, or alternatively, may be a value changing depending on the command signal. For example, there may be used a value based on the maximum acceleration in the past N times (N represents a predetermined number of times of stopping), or a mean value among the accelerations in the past N times.

The stopping-state response determination unit 8*a* receives the above-mentioned command status signal a and the control status amount signal, and evaluates the response in the stopping state, to thereby output the stopping-state response status signal.

Figure 12:
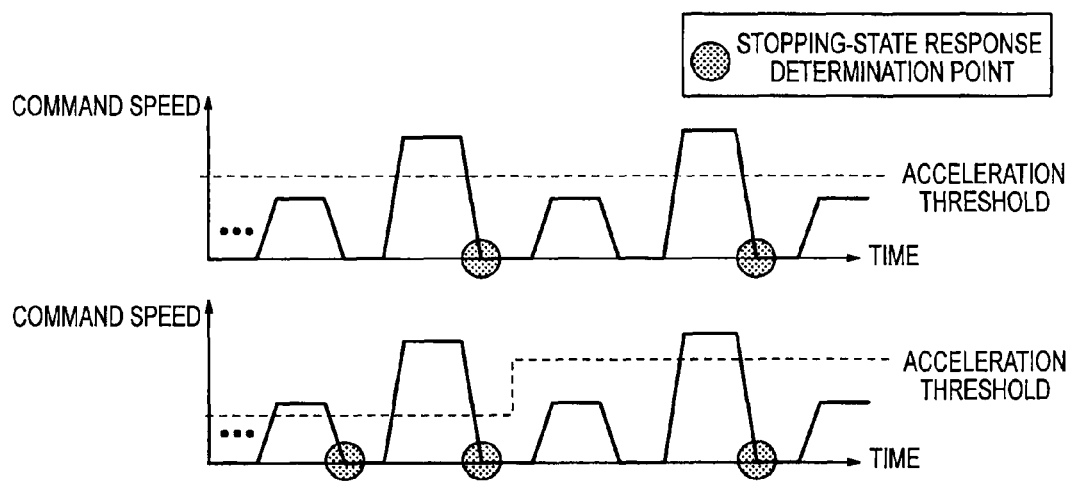
[FIG. 12] A waveform chart illustrating stopping-state response determination points according to the second embodiment of the present invention.

FIG. 12 is a waveform chart illustrating response determination points in the stopping state of the motor in the motor control device according to this embodiment. In FIG. 12, for simplicity of the description, a period of time required from the start of deceleration of the command speed until the stopping state is achieved is set to a fixed value. In other words, such an operation pattern is set that, as the speed at the start of the deceleration is higher, the degree of the acceleration in the stopping state is higher. Further, the acceleration threshold is described as a threshold of a degree of the speed at the start of the deceleration. As in FIG. 12, in a case where the acceleration threshold is set to a predetermined value (upper part of FIG. 12) or in a case where the acceleration threshold is changed based on the maximum acceleration in the past (lower part of FIG. 12), the response determination in the stopping state is performed at each point indicated by the hatched lines.

Here, when adjusting the feedforward gain as one of the control parameters, in order to increase the response of the machine, the feedforward gain needs to be increased within a range in which the positional deviation, which is the control status amount, satisfies target performance such as the overshoot amount in the stopping state or the stabilization time.

Further, the oscillation in the stopping state as described above is likely to occur when the acceleration is high, and hence, in a continuous operation pattern in which a single operation pattern is performed repeatedly, the control status amount may be evaluated for each stopping. However, in a case where the command signal which allows the operation pattern to change is input from the upper-level controller, the adjustment needs to be performed by selectively extracting points at which the acceleration in the stopping state is high.

By extracting the points at which the acceleration at the time when the motor stops is high in the command status determination unit 7*a* illustrated in FIG. 11, it is possible to adjust the feedforward gain in the stopping-state response determination unit 8*a* at the points at which the acceleration is high, that is, at the points suitable for the adjustment.

Next, effects obtained in the above-mentioned embodiment are described.

According to the motor control device in the second embodiment of the present invention, even in the case where the command signal input from the upper-level controller changes for each operation pattern, the feedforward gain can be adjusted in an appropriate manner because the points at which the acceleration is high can be extracted.

Third Embodiment

A motor control device according to a third embodiment of the present invention is described with reference to FIGS. 13 to 15.

Figure 13:
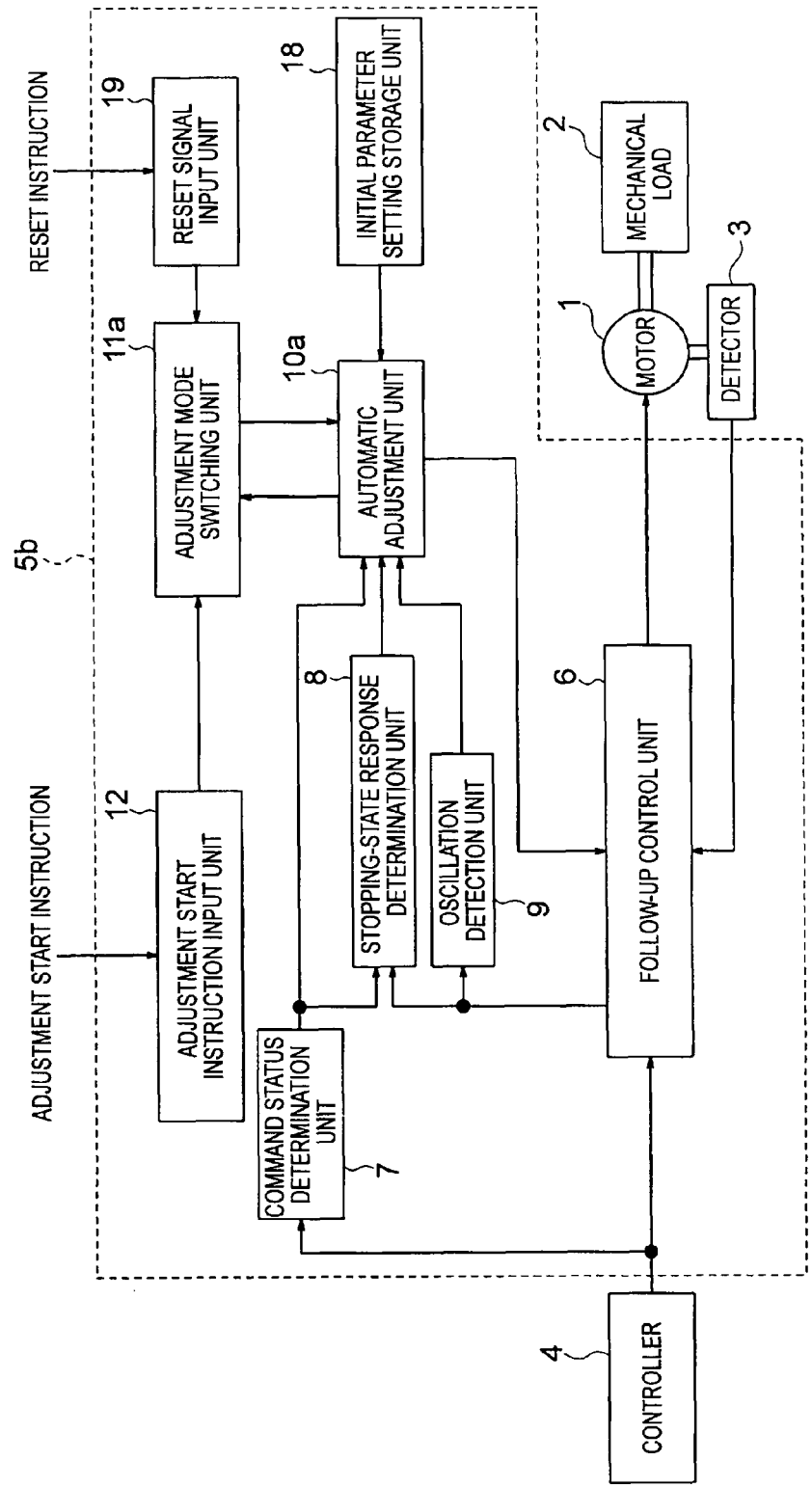
[FIG. 13] A block diagram of a motor control device according to a third embodiment of the present invention.

FIG. 13 is a block diagram of the motor control device according to this embodiment. The motor control device according to this embodiment includes an initial parameter setting storage unit 18 and a reset signal input unit 19 in addition to the components of the motor control device according to the first embodiment. Further, the motor control device according to this embodiment includes: an adjustment mode switching unit 11*a* for receiving a reset signal from the reset signal input unit 19 as well, in place of the adjustment mode switching unit 11; and an automatic adjustment unit 10*a* for receiving a parameter setting value signal from the initial parameter setting storage unit 18 as well, in place of the automatic adjustment unit 10. Other components of the motor control device according to this embodiment are the same as those of the motor control device according to the first embodiment, and description thereof is therefore omitted herein.

The initial parameter setting storage unit 18 stores standard initial parameters, which are initial control parameters at the time of shipment of the motor control device. When a reset instruction for the control parameters is input to the reset signal input unit 19, the reset signal is output from the reset signal input unit 19 to the adjustment mode switching unit 11*a*, and the adjustment mode switching unit 11*a* outputs the adjustment mode selection signal in accordance with the reset instruction to the automatic adjustment unit 10*a*. After that, the automatic adjustment unit 10*a* reads parameter setting values of the standard initial parameters from the initial parameter setting storage unit 18, and outputs the parameter setting signal in accordance with the parameter setting values to the follow-up control unit 6.

Now, the motor adjustment performed by the motor control device according to this embodiment is described conceptually.

Figure 14:
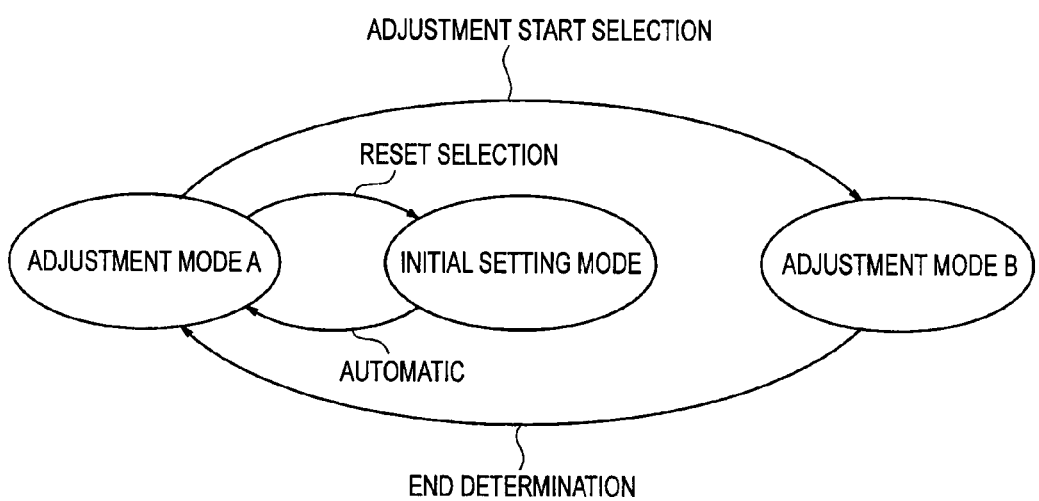
[FIG. 14] A conceptual diagram of mode transition in an automatic adjustment unit according to the third embodiment of the present invention.

FIG. 14 is a conceptual diagram of adjustment mode transition in the motor control device according to this embodiment. The conceptual diagram of the adjustment mode transition of FIG. 14 is different from the conceptual diagram of the adjustment mode transition of FIG. 7 described in the first embodiment in that an initial setting mode, in which the control parameters are changed to the standard initial parameters, is added. Description of the same components as those in the conceptual diagram of the adjustment mode transition of FIG. 7 described in the first embodiment is omitted herein. As illustrated in FIG. 13, when reset selection for the control parameters is performed under the state of the adjustment mode A, the motor control device transitions to the initial setting mode, and changes the control parameters to the standard initial parameters. After the change, the motor control device transitions to the adjustment mode A again.

Next, the operation at the time of the adjustment mode transition is described in detail.

Figure 15:
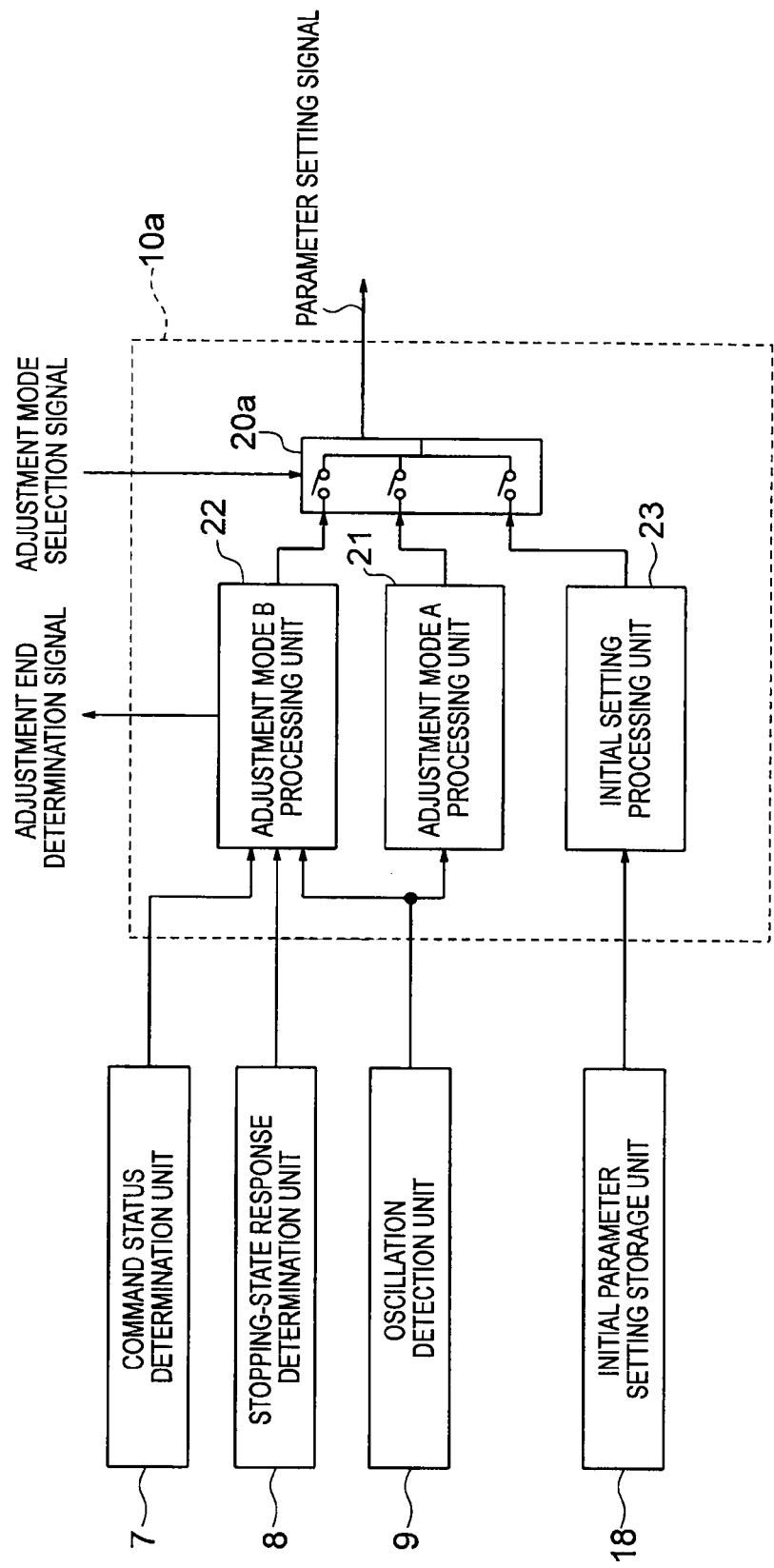
[FIG. 15] A block diagram of the automatic adjustment unit according to the third embodiment of the present invention.

FIG. 15 is a block diagram illustrating an internal operation of the automatic adjustment unit 10*a* in this embodiment. Description of the same components as those in FIG. 8 described in the first embodiment is omitted herein. In FIG. 15, at the time of power-on or the like, the motor control device is in the state of the adjustment mode A, in which the output from the adjustment mode A processing unit 21 is selected by an input switching unit 20*a* and is output from the automatic adjustment unit 10*a*. Under the state of the adjustment mode A, when the reset instruction is input and the reset signal is output from the reset signal input unit 19 to the adjustment mode switching unit 11*a*, the adjustment mode selection signal is transmitted from the adjustment mode switching unit 11*a* to the input switching unit 20*a*, and an initial setting processing unit 23 is executed by the input switching unit 20*a*, with the result that the motor control device enters the initial setting mode. In the initial setting mode, the initial setting processing unit 23 reads the standard initial parameters from the initial parameter setting storage unit 18, and outputs, to the follow-up control unit 6, the parameter setting signal for instruction to set the standard initial parameters as the control parameters. When the follow-up control unit 6 sets the standard initial parameters, the adjustment mode A processing unit 21 is executed by the input switching unit 20*a*, with the result that the motor control device enters the state of the adjustment mode A. When the adjustment start instruction is input under the state of the adjustment mode A, the adjustment start signal is output to the adjustment mode switching unit 11*a*, and the adjustment mode selection signal is transmitted from the adjustment mode switching unit 11*a* to the input switching unit 20*a*. Then, the adjustment mode B processing unit 22 is executed by the input switching unit 20*a*, with the result that the motor control device enters the state of the adjustment mode B.

As described above, in the automatic adjustment unit 10*a* in this embodiment, only by inputting the reset instruction to the reset signal input unit 19 under the state of operation in the adjustment mode A, it is possible to output, from the automatic adjustment unit 10*a* to the follow-up control unit 6, the parameter setting signal for changing the control parameters to the standard initial parameters in the initial setting mode.

Next, effects obtained in this embodiment are described.

According to the motor control device in this embodiment, the control parameters can be changed to the standard initial parameters by performing the reset selection under the state of the adjustment mode A. Further, the control parameters can be changed to the standard initial parameters by performing the reset selection even after the processing in the adjustment mode B, after the control parameters are adjusted manually, in a case where the characteristics of the mechanical load 2 are changed to a large extent, and further in a case where the characteristics of the mechanical load are changed to a large extent as in a case where the motor control device is newly connected to a different machine. Further, the control parameters can be changed to the standard initial parameters, which facilitates preparation for the readjustment of the control parameters even in the above-mentioned cases.

Further, the motor control device transitions to the adjustment mode A when the initial setting mode is ended, and thus stable motor control can be realized in the adjustment mode A even in a case where abnormality occurs in the control status amount or the like due to the change to the standard initial parameters in the initial setting mode.

Fourth Embodiment

Figure 16:
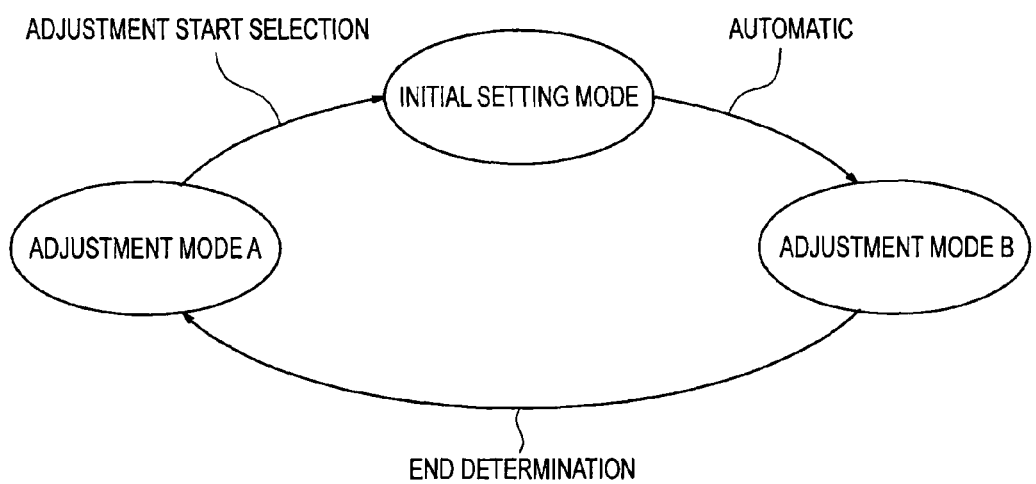
[FIG. 16] A conceptual diagram of mode transition in an automatic adjustment unit according to a fourth embodiment of the present invention.

A motor control device according to a fourth embodiment of the present invention is described with reference to FIGS. 16 and 17. FIG. 16 is a conceptual diagram of adjustment mode transition in the motor adjustment of this embodiment. Components of the adjustment mode of this embodiment are the same as those in the third embodiment. Further, components of the motor control device according to this embodiment are the same as those in the third embodiment.

Next, the operation at the time of the adjustment mode transition is described in detail. At the time of power-on or the like, the motor control device is in the state of the adjustment mode A. When the motor control device transitions from the adjustment mode A to the adjustment mode B in response to the adjustment start instruction, the motor control device temporarily transitions to the initial setting mode, in which the adjustment is performed so that the control parameters of the follow-up control unit 6 are changed to the standard initial parameters. When the adjustment in the initial setting mode is ended, the motor control device transitions to the adjustment mode B. When the adjustment in the adjustment mode B is ended, the motor control device enters the state of the adjustment mode A again.

Figure 17:
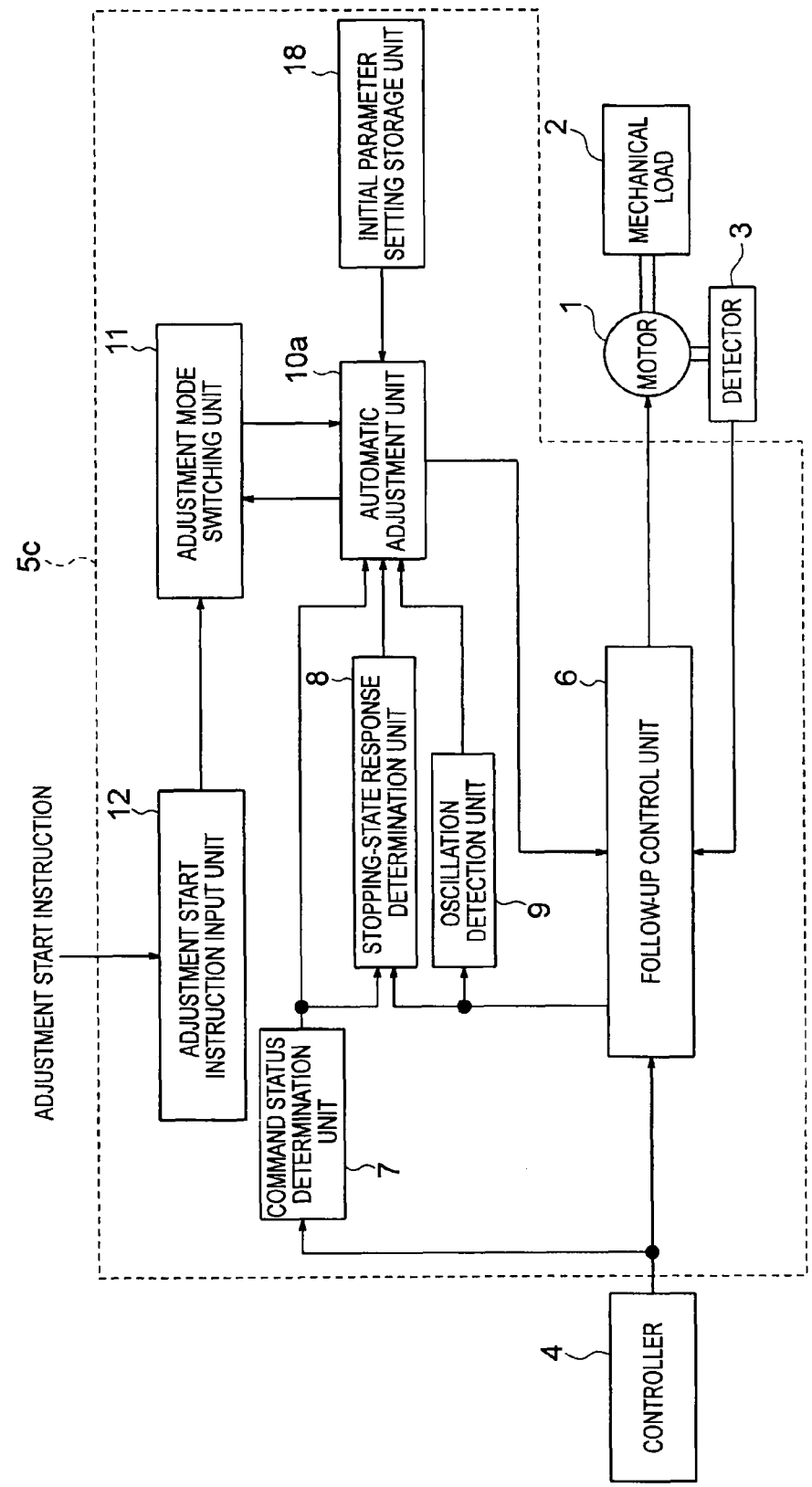
[FIG. 17] A block diagram of a motor control device according to the fourth embodiment of the present invention.

FIG. 17 is a block diagram of the motor control device of this embodiment. The motor control device in this embodiment has a configuration in which the reset signal input unit 19 is omitted from the motor control device according to the third embodiment, and the adjustment mode switching unit 11*a* is replaced with the adjustment mode switching unit 11. A block diagram of the automatic adjustment unit 10*a* in this embodiment is the same as that of FIG. 15 described above. Hence, when the adjustment start instruction is input under the state in which the motor is operating based on the command signal, the adjustment start signal is output from the adjustment start instruction input unit 12 to the adjustment mode switching unit 11, and then the adjustment mode switching unit 11 outputs the adjustment mode selection signal to the automatic adjustment unit 10*a*. The automatic adjustment unit 10*a*, which has received the adjustment mode selection signal, executes the initial setting processing unit 23, and outputs the output therefrom as the parameter setting signal to the follow-up control unit 6. After the setting in the initial setting mode is ended, the automatic adjustment unit 10*a* executes the adjustment mode B processing unit, and outputs the output therefrom as the parameter setting signal to the follow-up control unit 6. When the adjustment in the adjustment mode B is ended, the automatic adjustment unit 10*a* executes the adjustment mode A processing unit 21, and outputs the output therefrom as the parameter setting signal to the follow-up control unit 6. The state of the adjustment mode A is maintained until the adjustment start instruction is subsequently input.

As described above, in the automatic adjustment unit 10*a*, only by inputting the adjustment start instruction, it is possible to output the parameter setting signal for changing the control parameters to the standard initial parameters, and then execute the adjustment in the adjustment mode B.

Next, effects obtained in the above-mentioned embodiment are described.

According to the motor control device in this embodiment, only by inputting the adjustment start instruction through the adjustment start instruction input unit 12, it is possible to collectively perform the change of the control parameters to the standard initial parameters and the adjustment in the adjustment mode B. Thus, it is possible to perform the adjustment work through a minimal operation, perform the adjustment easily, and reduce the adjustment time without considering the change in characteristics of the mechanical load and the control parameter setting values before the start of the adjustment.

Fifth Embodiment

Figure 18:
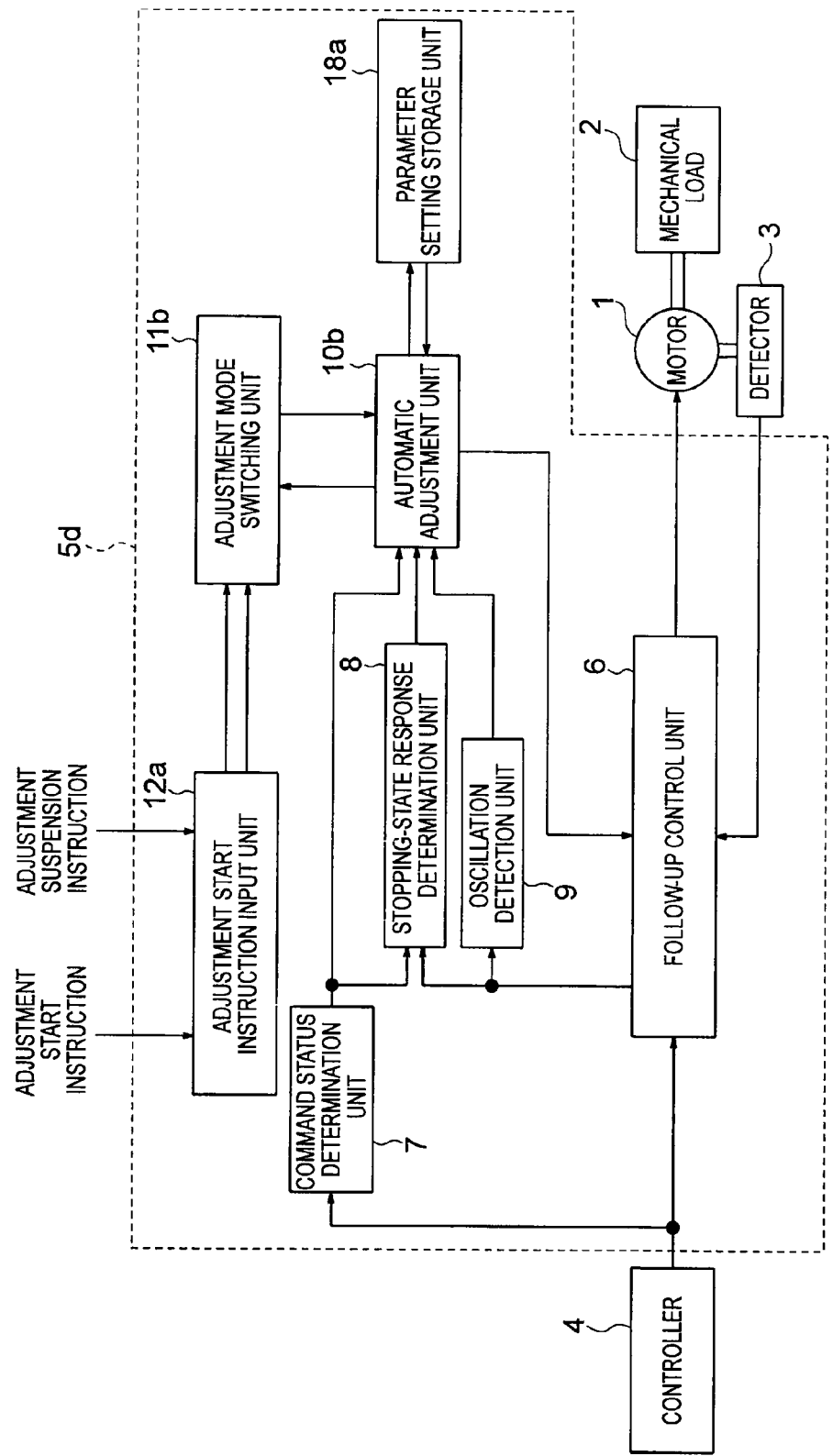
[FIG. 18] A block diagram of a motor control device according to a fifth embodiment of the present invention.
Figure 19:
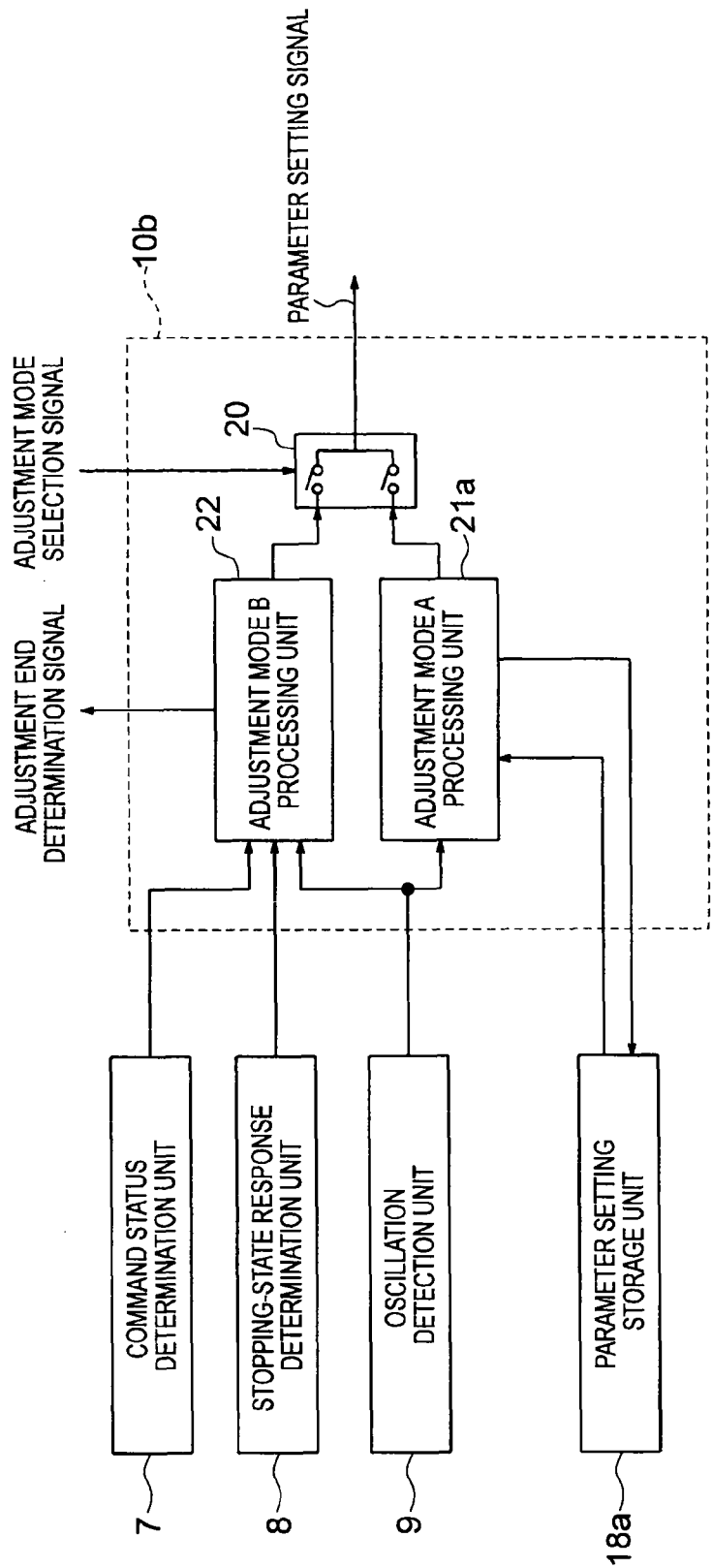
[FIG. 19] A block diagram of an automatic adjustment unit according to the fifth embodiment of the present invention.

A motor control device according to a fifth embodiment of the present invention is described with reference to FIGS. 18 and 19. FIG. 18 is a block diagram of the motor control device according to this embodiment. FIG. 19 is a block diagram of an automatic adjustment unit 10*b* in this embodiment. An adjustment mode transition operation in this embodiment is the same as the transition operation of the first embodiment, and hence a conceptual diagram of the adjustment mode transition in this embodiment is the same as that of FIG. 7 described in the first embodiment.

The motor control device in this embodiment is configured so that an adjustment start instruction input unit 12*a* for outputting the adjustment start signal and an adjustment suspension signal is provided to the motor control device of the first embodiment, in place of the adjustment start instruction input unit 12. Further, the motor control device in this embodiment includes an adjustment mode switching unit 11*b* for receiving the adjustment start signal and the adjustment suspension signal, in place of the adjustment mode switching unit 11. Further, the motor control device in this embodiment includes: a parameter setting storage unit 18a for outputting the control parameters or receiving the control parameters for storage; and the automatic adjustment unit 10b having added thereto a function of receiving the control parameters from the parameter setting storage unit 18a and outputting the control parameters to the parameter setting storage unit 18a for storage, in place of the automatic adjustment unit 10. Other components of the motor control device according to this embodiment are the same as the components of the motor control device according to the first embodiment illustrated in FIG. 2, and description thereof is therefore omitted herein.

Next, the operation at the time of the adjustment mode transition is described in detail with reference to FIGS. 18 and 19.

In FIG. 18, when the adjustment start instruction is input under the state in which the motor is operating based on the command signal in the state of the adjustment mode A, the automatic adjustment unit 10b outputs the control parameters before the switching from the adjustment mode A to the adjustment mode B to the parameter setting storage unit 18a for storage, and then the motor control device according to this embodiment transitions to the state of the adjustment mode B. Further, when an adjustment suspension instruction is input in the state of the adjustment mode B, the parameter setting storage unit 18a outputs the control parameters to the automatic adjustment unit 10b before the switching to the adjustment mode A. Then, the motor control device ends the adjustment mode B, and returns to the state of the adjustment mode A.

In FIG. 19, in a case where the adjustment start instruction is input in the state of the adjustment mode A that is being executed by an adjustment mode A processing unit 21a, the parameter setting storage unit 18a receives the control parameters before the switching from the adjustment mode A processing unit 21a for storage when the execution of the adjustment mode A processing unit 21a is ended and switched to the execution of the adjustment mode B processing unit 22. Further, in a case where the adjustment suspension instruction is input in the state of the adjustment mode B that is being executed by the adjustment mode B processing unit 22, the parameter setting storage unit 18a outputs the stored control parameters to the adjustment mode A processing unit 21a. Then, it is determined that the adjustment in the adjustment mode B is ended, and the adjustment mode is switched to the adjustment mode A, to thereby execute the adjustment mode A processing unit 21a.

As described above, in this embodiment, the control parameters at the time of switching from the adjustment mode A to the adjustment mode B are stored in the parameter setting storage unit 18a from the adjustment mode A processing unit 21a of the automatic adjustment unit 10b. When the adjustment suspension signal is input through the adjustment start instruction input unit 12a during the adjustment in the adjustment mode B, the adjustment operation in the adjustment mode B can be suspended, and the control parameters are output from the parameter setting storage unit 18a to the adjustment mode A processing unit 21a of the automatic adjustment unit 10b before the switching to the adjustment mode A.

Further, in the operation at the time when the adjustment is suspended, only the change of the control parameters is performed unlike an operation at the time of so-called emergency stop. Thus, it is possible to suspend the adjustment operation under the state in which the operation based on the command signal continues.

Next, effects obtained in the above-mentioned embodiment are described.

According to the motor control device in this embodiment, by inputting the adjustment suspension signal during the adjustment in the adjustment mode B, it is possible to suspend the adjustment with the operation continuing. Thus, it is possible to easily perform recovery work regarding reoperation of the machine unlike such a suspension method as the emergency stop action, in which peripheral devices of the machine are stopped as well as the motor drive.

Furter, the parameters stored in the parameter setting storage unit 18a are parameters adjusted so as to allow a stable operation in the adjustment mode A. Thus, the stable operation can be realized.

Further, the adjustment start signal and the adjustment suspension signal can be output through the common adjustment start instruction input unit 12a. Thus, it is possible to reduce resources of the interfaces of the motor control device, and simplify the operation.

Sixth Embodiment

Next, a sixth embodiment of the present invention is described with reference to FIGS. 20 to 23.

Figure 20:
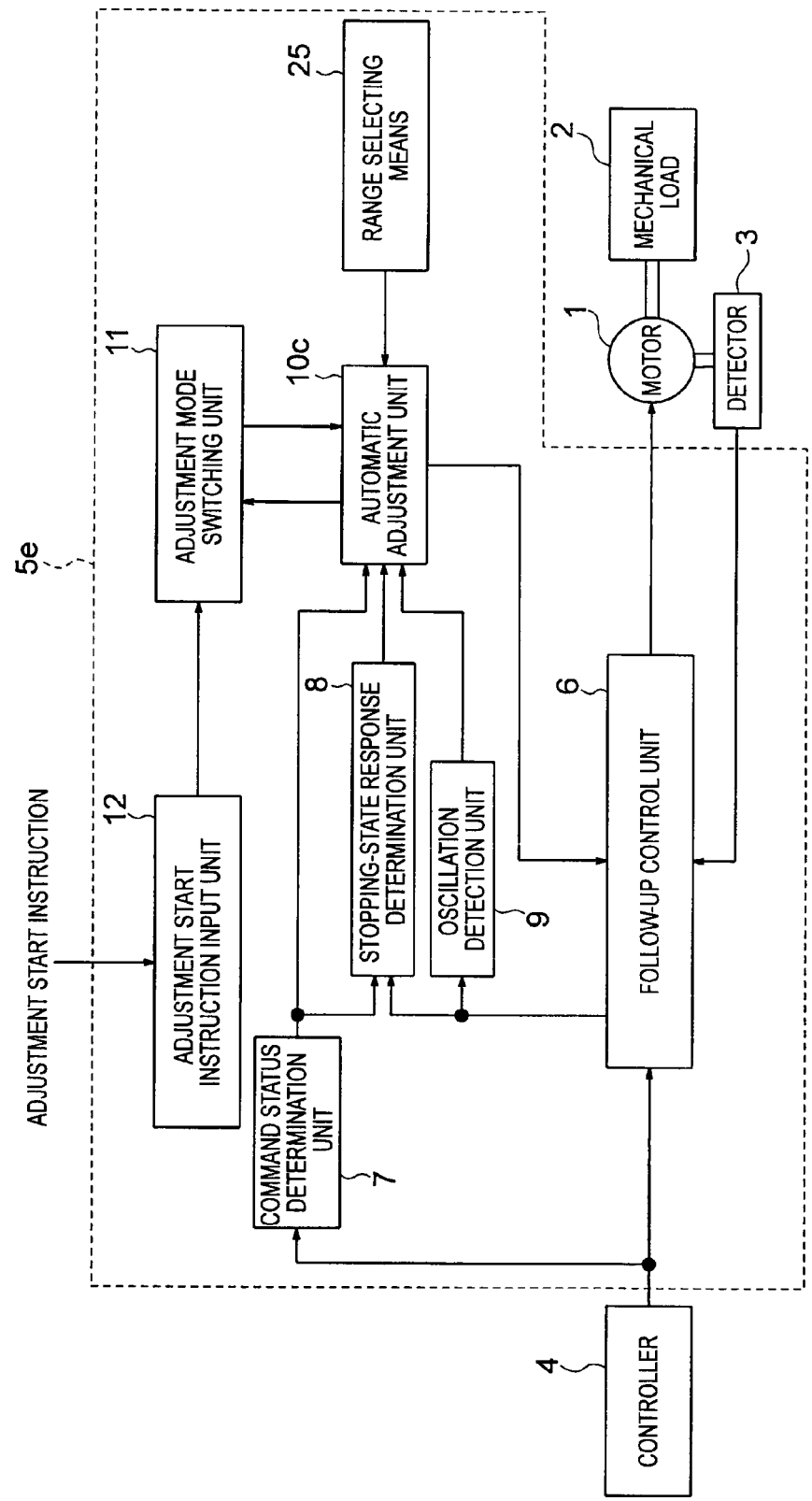
[FIG. 20] A block diagram of a motor control device according to a sixth embodiment of the present invention.

FIG. 20 is a block diagram of a motor control device in the sixth embodiment. The motor control device of this embodiment illustrated in FIG. 20 is configured so that range selecting means 25 is added to the motor control device according to the first embodiment, the range selecting means 25 being used for limiting a changeable range of the control parameters. Further, the motor control device of this embodiment includes an automatic adjustment unit 10c having an adjustment mode C, for receiving a range selection signal from the range selecting means 25, in place of the automatic adjustment unit 10. Description of the same components as those of the motor control device according to the first embodiment illustrated in the block diagram of FIG. 2 is omitted herein.

Figure 21:
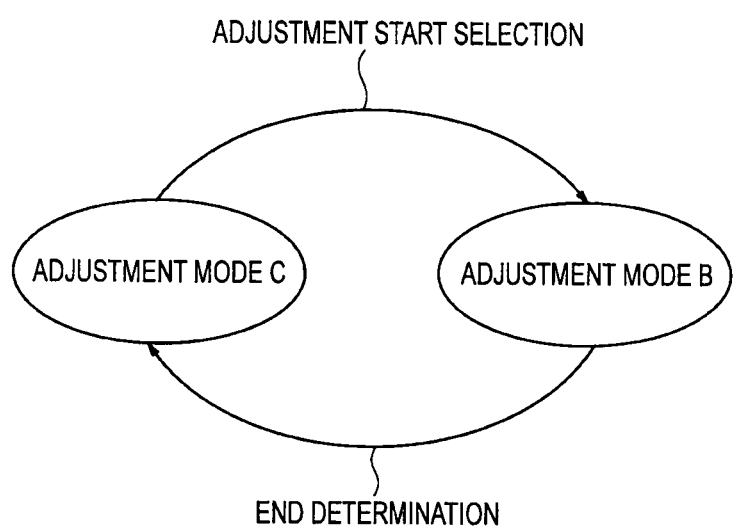
[FIG. 21] A conceptual diagram of mode transition in an automatic adjustment unit according to the sixth embodiment of the present invention.

FIG. 21 is a conceptual diagram of adjustment mode transition in the sixth embodiment. The adjustment mode transition in the sixth embodiment is the same as the adjustment mode transition in the first embodiment except that the adjustment mode A is replaced with the adjustment mode C. That is, after the motor control device 5 is powered on, the motor control device enters the state of the adjustment mode C. Further, when the adjustment start instruction is input through the adjustment start instruction input unit 12 under the state in which the motor is operating based on the command signal in the state of the adjustment mode C, the motor control device transitions to the state of the adjustment mode B. When the adjustment of the control parameters in a searching manner under the state of the adjustment mode B is ended, the motor control device transitions to the state of the adjustment mode C again. An operation in the adjustment mode C is described later.

Next, an internal operation of the automatic adjustment unit 10c in the sixth embodiment is described with reference to FIGS. 22 and 23.

Figure 22:
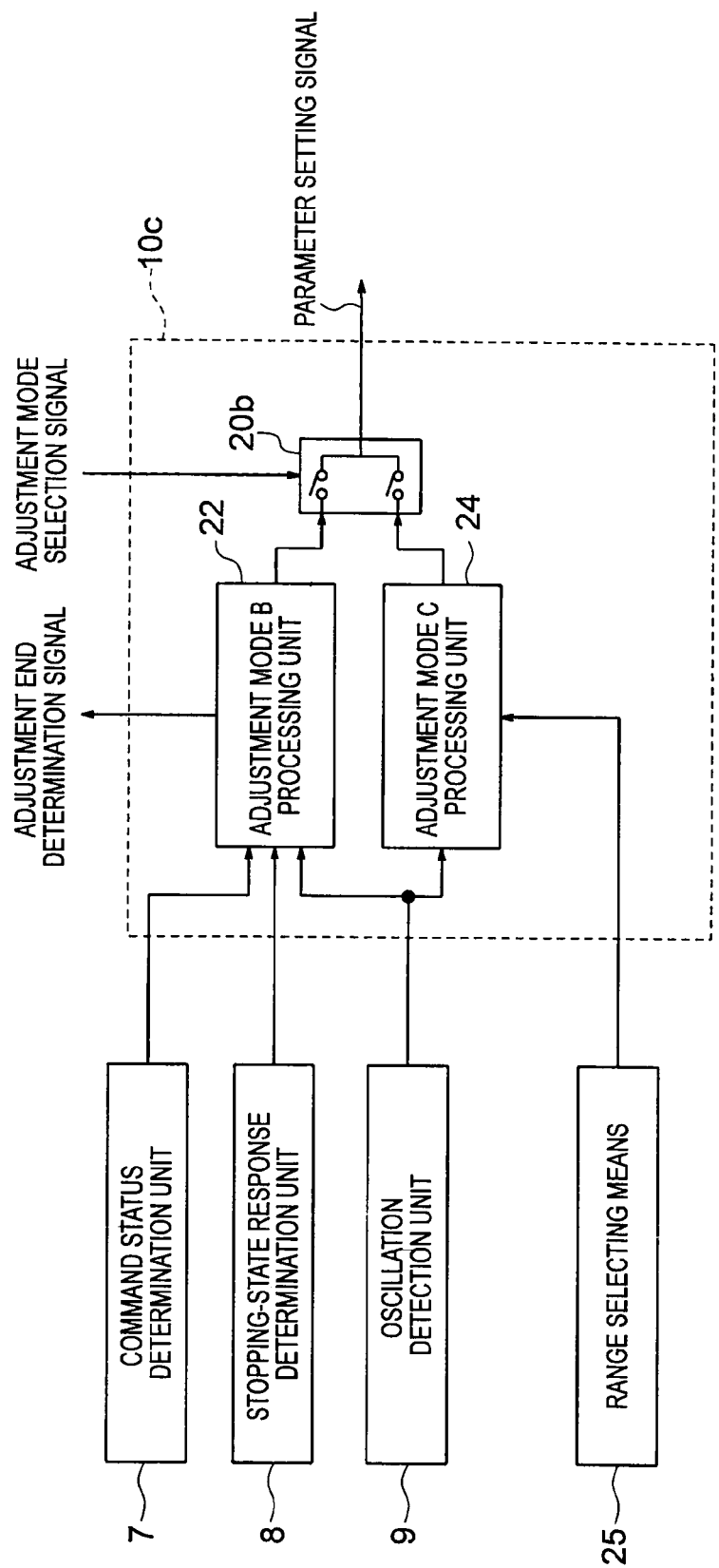
[FIG. 22] A block diagram of the automatic adjustment unit according to the sixth embodiment of the present invention.

FIG. 22 is a block diagram illustrating the internal operation of the automatic adjustment unit 10c. Description of the same components as those of the automatic adjustment unit 10 according to the first embodiment described with reference to FIG. 8 is omitted herein. In response to a control parameter adjustment range selection instruction input from the controller 4 or from outside, the range selecting means 25 selects a control parameter adjustment range of an adjustment mode C processing unit 24.

Figure 23:
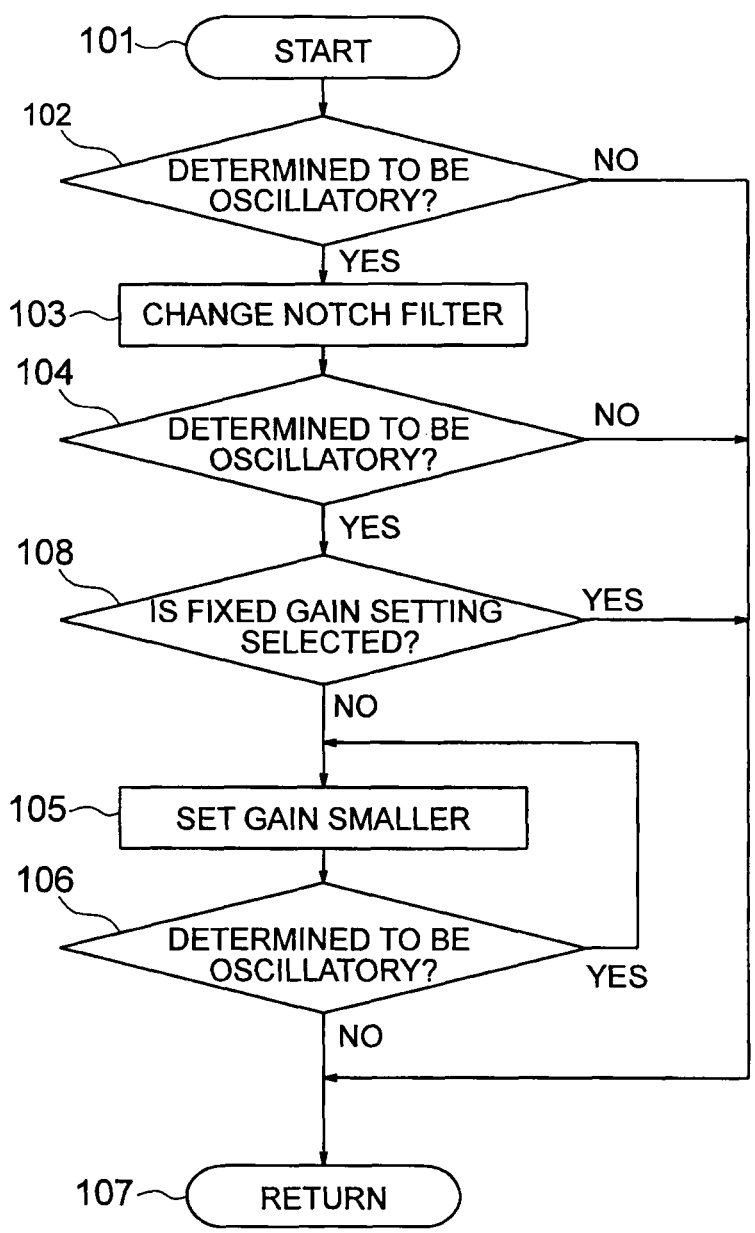
[FIG. 23] A flow chart in an adjustment mode C according to the sixth embodiment of the present invention.

FIG. 23 is a flow chart of processing performed by the adjustment mode C processing unit 24. The same processing steps as the processing steps of the adjustment mode A processing unit 21 in the first embodiment described with reference to FIG. 9 are represented by the same reference symbols, and description thereof is therefore omitted herein.

Referring to FIG. 23, in Step 108, the adjustment mode C processing unit 24 includes means for switching between fixed gain setting and variable gain setting depending on the selection in the range selecting means 25.

In the case of the fixed gain setting, the adjustment mode C processing unit 24 proceeds to Step 107 without changing the gain setting after the determination in Step 108.

In the case of the variable gain setting, the adjustment mode C processing unit 24 proceeds to Step 105 after the determination in Step 108, in which the gain is set smaller and is changed until a stable state is achieved.

As described above, the automatic adjustment unit 10c in this embodiment can switch the operation in the adjustment mode C between the fixed gain setting and the variable gain setting by the range selecting means 25.

Note that, the description has been given of the case where the gain setting range is switched between the fixed range and the variable range, but the present invention is not limited thereto, and the variable range may be switched between different ranges.

Next, effects obtained in the above-mentioned embodiment are described.

According to the motor control device in the sixth embodiment of the present invention, in the case where the range selecting means 25 selects the variable gain setting, it is possible to perform the adjustment while giving priority to the stabilization of the motor control device. In the case where the range selecting means 25 selects the fixed gain setting, it is possible to perform the adjustment only within the range in which the response of the machine is less influenced. Thus, in a case where a plurality of motor control devices are synchronized to operate, it is possible to perform an operation with the synchronization property maintained.

Industrial Applicability

As described above, the motor control device according to the present invention is useful for a control device for a motor for driving a mechanical load. In particular, the motor control device according to the present invention is suitable for a motor control device for controlling a mechanical load, which is required to perform adjustment at the time of initial activation and during actual operation.

Reference Signs List

1: motor, 2: mechanical load, 3: detector, 4: controller, 5, 5a, 5b, 5c, 5d, 5e: motor control device, 6: follow-up control unit, 7, 7a: command status determination unit, 8, 8a: stopping-state response determination unit, 9: oscillation detection unit, 10, 10a, 10b, 10c: automatic adjustment unit, 11, 11a, 11b: adjustment mode switching unit, 12, 12a: adjustment start instruction input unit, 18: initial parameter setting storage unit, 18a: parameter setting storage unit, 19: reset signal input unit, 25: range selecting means, 61: feedback controller, 62: notch filter, 63: feedforward controller.

The invention claimed is:

1. A motor control device for controlling a motor for driving a mechanical load, based on a detection information signal input from a detector that is connected to the motor, the motor control device comprising:
a command status determination unit for outputting, as a command status signal, a result of determining a status of a command signal, including information indicating presence or absence of a command speed in the command signal, the command signal output from a controller which outputs a control command to the motor;
a follow-up control unit for receiving the detection information signal and the command signal to output, to the motor, a torque command signal for driving the motor and output a control status of the motor as a control status amount signal;
a stopping-state response determination unit for receiving the command status signal and the control status amount signal to output, as a stopping-state response status signal, a result of determining a response status of the motor in a motor stopping state;
an oscillation detection unit for receiving the control status amount signal to output, as an oscillation detection signal, a result of detecting oscillation of a control status amount that occurs in the follow-up control unit;
an automatic adjustment unit for receiving the command status signal, the stopping-state response status signal, and the oscillation detection signal, the automatic adjustment unit comprising a plurality of adjustment modes for adjusting a control parameter of the follow-up control unit based on the received command status signal, the received stopping-state response status signal, and the received oscillation detection signal; and
an adjustment start instruction input unit for receiving an adjustment start instruction from outside to output an adjustment start signal,
wherein the automatic adjustment unit comprises:
a first adjustment mode for monitoring the control status of the motor and adjusting the control parameter only when abnormality is detected in the control status of the motor, irrespective of presence and absence of the command speed in the command signal; and
a second adjustment mode, which transitions from the first adjustment mode in response to the adjustment start instruction to adjust the control parameter based on the command signal, the oscillation detection signal, and the stopping-state response status signal after confirming that the command speed is present in the command signal based on the command status signal, and transitions to the first adjustment mode again after the adjustment is ended.

2. A motor control device according to claim 1,
wherein the follow-up control unit comprises:
a feedforward controller for receiving the command signal to calculate and output a torque signal which makes the motor follow up the command signal;
a feedback controller for receiving the command signal and the detection information signal to calculate and output a torque signal which makes the detection information signal follow up the command signal; and
a notch filter for outputting a result of performing calculation to cut off a predetermined frequency component of the torque signal output from the feedback controller, and
wherein the control parameter of the follow-up control unit comprises:
feedforward gain of the feedforward controller;
a coefficient of the notch filter; and
feedback gain of the feedback controller,
wherein the first adjustment mode adjusts the coefficient of the notch filter and the feedback gain based on the oscillation detection signal, and
wherein the second adjustment mode adjusts the coefficient of the notch filter and the feedback gain based on the command status signal and the oscillation detection signal, and adjusts the feedforward gain based on the command status signal and the stopping-state response status signal.

3. A motor control device according to claim 1, further comprising:
- an initial parameter setting storage unit for storing and outputting a standard initial parameter, which is set in advance as the control parameter of the follow-up control unit;
- an adjustment mode switching unit for outputting an adjustment mode selection signal for selecting one of the plurality of adjustment modes to the automatic adjustment unit, based on an adjustment end determination signal, which is obtained by the automatic adjustment unit determining a current state as an adjustment end state, and the adjustment start signal; and
- a reset signal input unit for receiving a reset instruction from the outside to output a reset signal to the adjustment mode switching unit,
- wherein the automatic adjustment unit further comprises an initial setting mode for outputting a parameter setting signal for changing the control parameter to the standard initial parameter, and
- wherein the first adjustment mode transitions to the initial setting mode in response to the reset instruction, and after adjustment in the initial setting mode is ended, the initial setting mode transitions to the first adjustment mode again.

4. A motor control device according to claim 1, further comprising an initial parameter setting storage unit for storing and outputting a standard initial parameter set in advance as the control parameter of the follow-up control unit,
- wherein the automatic adjustment unit further comprises an initial setting mode for outputting a parameter setting signal for changing the control parameter to the standard initial parameter, and
- wherein the first adjustment mode transitions to the initial setting mode in response to the adjustment start instruction, and after adjustment in the initial setting mode is ended, the initial setting mode transitions to the second adjustment mode.

5. A motor control device according to claim 1, further comprising:
- a parameter setting storage unit for receiving, outputting and storing the control parameter of the follow-up control unit when one of the plurality of adjustment modes of the automatic adjustment unit transitions to another one of the plurality of adjustment modes; and
- an adjustment mode switching unit for outputting an adjustment mode selection signal for selecting one of the plurality of adjustment modes to the automatic adjustment unit, based on an adjustment end determination signal, which is obtained by the automatic adjustment unit determining a current state as an adjustment end state, and the adjustment start signal,
- wherein the adjustment start instruction input unit receives an adjustment suspension instruction from the outside and outputs an adjustment suspension signal to the adjustment mode switching unit,
- wherein the adjustment mode switching unit receives the adjustment suspension signal output from the adjustment start instruction input unit, and
- wherein the automatic adjustment unit outputs, to the parameter setting storage unit, the control parameter when the first adjustment mode transitions to the second adjustment mode in response to the adjustment start instruction, suspends an adjustment operation in the second adjustment mode when the adjustment suspension instruction is input during adjustment in the second adjustment mode, and receives the control parameter stored in the parameter setting storage unit before the second adjustment mode transitions to the first adjustment mode.

6. A motor control device according to claim 5, further comprising range selecting means for selecting an adjustment range of a control parameter of the follow-up control unit in the first adjustment mode.

7. A motor control device according to claim 1, further comprising range selecting means for selecting an adjustment range of a control parameter of the follow-up control unit in the first adjustment mode.

* * * * *